(12) United States Patent
Bone et al.

(10) Patent No.: US 9,897,780 B1
(45) Date of Patent: Feb. 20, 2018

(54) OPTICAL IMAGING LENS

(71) Applicant: Genius Electronic Optical Co., Ltd., Taichung (TW)

(72) Inventors: Matthew Bone, Taichung (TW); Maozong Lin, Fujian (CN); Zhenfeng Xie, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/273,716

(22) Filed: Sep. 23, 2016

(30) Foreign Application Priority Data

Aug. 25, 2016 (CN) .......................... 2016 1 0725556

(51) Int. Cl.
*G02B 17/00* (2006.01)
*G02B 13/00* (2006.01)
*G02B 9/34* (2006.01)
*G02B 27/00* (2006.01)

(52) U.S. Cl.
CPC ............ *G02B 13/004* (2013.01); *G02B 9/34* (2013.01); *G02B 13/0065* (2013.01); *G02B 27/0025* (2013.01)

(58) Field of Classification Search
CPC ...... G02B 17/02; G02B 17/00; G02B 17/023; G02B 13/002; G02B 13/004; G02B 9/36; G02B 9/34; G02B 13/0065; G02B 27/0025
USPC ................ 359/726, 733, 734, 715, 771, 775
See application file for complete search history.

(56) References Cited

U.S. PATENT DOCUMENTS

2012/0293871 A1\* 11/2012 Kubota ................ G02B 15/173
359/680

\* cited by examiner

*Primary Examiner* — William Choi
(74) *Attorney, Agent, or Firm* — JCIPRNET

(57) ABSTRACT

An optical imaging lens includes a first lens element, a second lens element, a third lens element, and a fourth lens element from an object side to an image side in order along an optical axis. The first lens element to the fourth lens element each include an object-side surface and an image-side surface. The first lens element has positive refracting power. The second lens element has negative refracting power. At least one of the object-side surface and the image-side surface of the third lens element is an aspheric surface. At least one of the object-side surface and the image-side surface of the fourth lens element is an aspheric surface. A maximum distance between the image-side surface of the first lens element and the object-side surface of the second lens element in a direction parallel to the optical axis is less than 0.2 mm.

18 Claims, 28 Drawing Sheets

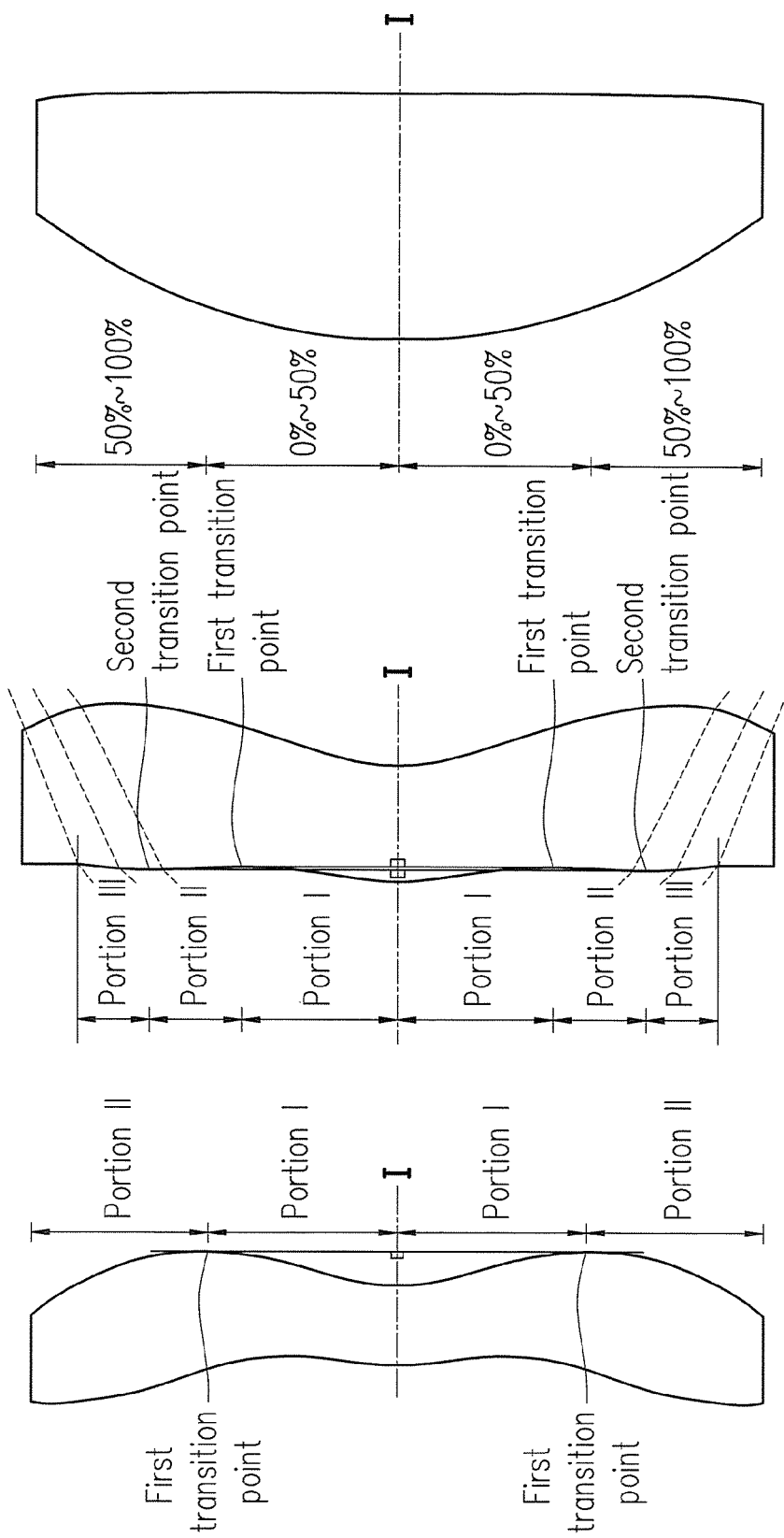

| First embodiment |||||||
|---|---|---|---|---|---|---|
| Effective focal length=10.036 mm , Half field of view=14.046°, f-number=2.800, System length=9.143 mm, Image height=2.517 mm, Focal length of the front lens group=8.405 mm, Depth=6.043 mm |||||||
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.664 | | | |
| First lens element 3 | Object-side surface 31 | 2.859 | 0.973 | 1.535 | 55.690 | 4.695 |
| | Image-side surface 32 | -18.660 | 0.050 | | | |
| Second lens element 4 | Object-side surface 41 | -19.503 | 0.263 | 1.640 | 23.529 | -9.004 |
| | Image-side surface 42 | 8.307 | 2.244 | | | |
| Reflector 8 | Reflective surface 81 | Infinite | -3.014 | | | |
| Third lens element 5 | Object-side surface 51 | -5.126 | -0.313 | 1.545 | 55.987 | -9.075 |
| | Image-side surface 52 | -2.466 | -0.540 | | | |
| Fourth lens element 6 | Object-side surface 61 | 86.439 | -0.828 | 1.640 | 23.529 | -149.477 |
| | Image-side surface 62 | 843.416 | -0.127 | | | |
| Filter 9 | Object-side surface 91 | Infinite | -0.210 | 1.517 | 64.167 | |
| | Image-side surface 92 | Infinite | -0.581 | | | |
| | Image plane 100 | Infinite | | | | |

FIG. 8

| Surface | K | $a_2$ | $a_4$ | $a_6$ | $a_8$ |
|---|---|---|---|---|---|
| 31 | 0.000000E+00 | -1.537463E-04 | 4.440763E-03 | -4.648128E-03 | 2.749542E-03 |
| 32 | 0.000000E+00 | 7.435465E-03 | 0.000000E+00 | 0.000000E+00 | 0.000000E+00 |
| 41 | 0.000000E+00 | 1.378230E-02 | 1.831583E-04 | 0.000000E+00 | 0.000000E+00 |
| 42 | 0.000000E+00 | 1.411420E-02 | 1.256446E-03 | 6.813826E-04 | -3.186558E-04 |
| 51 | 0.000000E+00 | 6.698510E-02 | 5.808696E-02 | -4.158093E-02 | 1.330044E-02 |
| 52 | 0.000000E+00 | 1.674016E-02 | 1.007570E-01 | -7.798115E-02 | 3.306273E-02 |
| 61 | 0.000000E+00 | -4.976190E-02 | 2.763265E-02 | -1.212016E-02 | 3.827493E-03 |
| 62 | 0.000000E+00 | 9.374422E-03 | -3.859139E-03 | 4.533535E-04 | 0.000000E+00 |
| Surface | $a_{10}$ | $a_{12}$ | $a_{14}$ | | |
| 31 | -8.939336E-04 | 1.512940E-04 | -1.032737E-05 | | |
| 32 | 0.000000E+00 | 0.000000E+00 | 0.000000E+00 | | |
| 41 | 0.000000E+00 | 0.000000E+00 | 0.000000E+00 | | |
| 42 | 7.298036E-05 | 0.000000E+00 | 0.000000E+00 | | |
| 51 | -1.604359E-03 | 0.000000E+00 | 0.000000E+00 | | |
| 52 | -7.973838E-03 | 1.032134E-03 | -5.615426E-05 | | |
| 61 | -7.302021E-04 | 7.494417E-05 | -3.167368E-06 | | |
| 62 | 0.000000E+00 | 0.000000E+00 | 0.000000E+00 | | |

FIG. 9

| Second embodiment ||||||
|---|---|---|---|---|---|---|
| Effective focal length= 10.025 mm , Half field of view= 14.069°, f-number= 2.800, System length= 9.285 mm, Image height= 2.517 mm, Focal length of the front lens group= 8.456 mm, Depth= 6.043 mm |||||||
| Lens element | Surface | Radius of curvature (mm) | Thickness (mm) | Index of refraction | Abbe number | Focal length (mm) |
|---|---|---|---|---|---|---|
| Object | | Infinite | 5001 | | | |
| Aperture stop 2 | | Infinite | -0.670 | | | |
| First lens element 3 | Object-side surface 31 | 2.854 | 0.962 | 1.535 | 55.690 | 4.795 |
| | Image-side surface 32 | -23.015 | 0.050 | | | |
| Second lens element 4 | Object-side surface 41 | -20.025 | 0.323 | 1.640 | 23.529 | -9.338 |
| | Image-side surface 42 | 8.661 | 2.252 | | | |
| Reflector 8 | Reflective surface 81 | Infinite | -2.933 | | | |
| Third lens element 5 | Object-side surface 51 | -4.210 | -0.297 | 1.545 | 55.987 | -10.471 |
| | Image-side surface 52 | -2.364 | -0.676 | | | |
| Fourth lens element 6 | Object-side surface 61 | 35.878 | -1.119 | 1.640 | 23.529 | -48.120 |
| | Image-side surface 62 | -231.742 | -0.163 | | | |
| Filter 9 | Object-side surface 91 | Infinite | -0.210 | 1.517 | 64.167 | |
| | Image-side surface 92 | Infinite | -0.300 | | | |
| | Image plane 100 | Infinite | | | | |

FIG. 12

| Surface | K | $a_2$ | $a_4$ | $a_6$ | $a_8$ |
|---|---|---|---|---|---|
| 31 | 0.000000E+00 | 7.832154E-05 | 4.418995E-03 | -4.634081E-03 | 2.748784E-03 |
| 32 | 0.000000E+00 | 7.415477E-03 | 0.000000E+00 | 0.000000E+00 | 0.000000E+00 |
| 41 | 0.000000E+00 | 1.353788E-02 | 7.522376E-05 | 0.000000E+00 | 0.000000E+00 |
| 42 | 0.000000E+00 | 1.439115E-02 | 1.151681E-03 | 6.533872E-04 | -3.040808E-04 |
| 51 | 0.000000E+00 | 6.279606E-02 | 6.066006E-02 | -4.221358E-02 | 1.324889E-02 |
| 52 | 0.000000E+00 | 2.097164E-02 | 1.004942E-01 | -7.805470E-02 | 3.306702E-02 |
| 61 | 0.000000E+00 | -5.020292E-02 | 2.693772E-02 | -1.201545E-02 | 3.831080E-03 |
| 62 | 0.000000E+00 | 5.453664E-03 | -2.890056E-03 | 3.382265E-04 | 0.000000E+00 |
| Surface | $a_{10}$ | $a_{12}$ | $a_{14}$ | | |
| 31 | -8.936515E-04 | 1.517496E-04 | -1.040416E-05 | | |
| 32 | 0.000000E+00 | 0.000000E+00 | 0.000000E+00 | | |
| 41 | 0.000000E+00 | 0.000000E+00 | 0.000000E+00 | | |
| 42 | 7.584174E-05 | 0.000000E+00 | 0.000000E+00 | | |
| 51 | -1.561967E-03 | 0.000000E+00 | 0.000000E+00 | | |
| 52 | -7.966681E-03 | 1.033165E-03 | -5.639007E-05 | | |
| 61 | -7.311663E-04 | 7.477159E-05 | -3.167366E-06 | | |
| 62 | 0.000000E+00 | 0.000000E+00 | 0.000000E+00 | | |

FIG. 13

| Third embodiment |||||||
|---|---|---|---|---|---|---|
| Effective focal length= 10.079 mm , Half field of view= 14.008°, f-number= 2.801, System length= 9.434 mm, Image height= 2.517 mm, Focal length of the front lens group= 8.51 mm, Depth= 5.920 mm |||||||
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.656 | | | |
| First lens element 3 | Object-side surface 31 | 2.898 | 0.950 | 1.535 | 55.690 | 4.850 |
| | Image-side surface 32 | -22.603 | 0.092 | | | |
| Second lens element 4 | Object-side surface 41 | -18.355 | 0.279 | 1.640 | 23.529 | -9.511 |
| | Image-side surface 42 | 9.260 | 2.116 | | | |
| Reflector 8 | Reflective surface 81 | Infinite | -2.806 | | | |
| Third lens element 5 | Object-side surface 51 | -3.725 | -0.408 | 1.545 | 55.987 | -11.047 |
| | Image-side surface 52 | -2.214 | -0.913 | | | |
| Fourth lens element 6 | Object-side surface 61 | 22.790 | -1.315 | 1.640 | 23.529 | -153.562 |
| | Image-side surface 62 | 30.277 | -0.156 | | | |
| Filter 9 | Object-side surface 91 | Infinite | -0.210 | 1.517 | 64.167 | |
| | Image-side surface 92 | Infinite | -0.188 | | | |
| | Image plane 100 | Infinite | | | | |

FIG. 16

| Surface | K | $a_2$ | $a_4$ | $a_6$ | $a_8$ |
|---|---|---|---|---|---|
| 31 | 0.000000E+00 | -1.353018E-04 | 4.431943E-03 | -4.624601E-03 | 2.750746E-03 |
| 32 | 0.000000E+00 | 7.408104E-03 | 0.000000E+00 | 0.000000E+00 | 0.000000E+00 |
| 41 | 0.000000E+00 | 1.373392E-02 | 1.069588E-05 | 0.000000E+00 | 0.000000E+00 |
| 42 | 0.000000E+00 | 1.347030E-02 | 1.001321E-03 | 6.475985E-04 | -3.039630E-04 |
| 51 | 0.000000E+00 | 4.618647E-02 | 6.514156E-02 | -4.247257E-02 | 1.321064E-02 |
| 52 | 0.000000E+00 | 2.294320E-02 | 1.018712E-01 | -7.809052E-02 | 3.302607E-02 |
| 61 | 0.000000E+00 | -3.977984E-02 | 2.578029E-02 | -1.211827E-02 | 3.831490E-03 |
| 62 | 0.000000E+00 | 7.617560E-04 | 3.274388E-04 | -1.044850E-04 | 0.000000E+00 |
| Surface | $a_{10}$ | $a_{12}$ | $a_{14}$ | | |
| 31 | -8.944332E-04 | 1.516098E-04 | -1.035232E-05 | | |
| 32 | 0.000000E+00 | 0.000000E+00 | 0.000000E+00 | | |
| 41 | 0.000000E+00 | 0.000000E+00 | 0.000000E+00 | | |
| 42 | 7.012692E-05 | 0.000000E+00 | 0.000000E+00 | | |
| 51 | -1.542506E-03 | 0.000000E+00 | 0.000000E+00 | | |
| 52 | -7.969182E-03 | 1.034734E-03 | -5.588179E-05 | | |
| 61 | -7.307912E-04 | 7.477142E-05 | -3.169257E-06 | | |
| 62 | 0.000000E+00 | 0.000000E+00 | 0.000000E+00 | | |

FIG. 17

| Fourth embodiment |||||||
|---|---|---|---|---|---|---|
| Effective focal length=10.021 mm , Half field of view=14.044°, f-number=2.800, System length= 9.009 mm, Image height=2.517 mm, Focal length of the front lens group=8.405 mm, Depth=5.772 mm |||||||
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.677 | | | |
| First lens element 3 | Object-side surface 31 | 2.831 | 0.984 | 1.535 | 55.690 | 4.661 |
| | Image-side surface 32 | -18.843 | 0.083 | | | |
| Second lens element 4 | Object-side surface 41 | -15.733 | 0.272 | 1.640 | 23.529 | -8.913 |
| | Image-side surface 42 | 9.111 | 1.952 | | | |
| Reflector 8 | Reflective surface 81 | Infinite | -2.955 | | | |
| Third lens element 5 | Object-side surface 51 | -4.814 | -0.422 | 1.545 | 55.987 | -8.803 |
| | Image-side surface 52 | -2.331 | -0.786 | | | |
| Fourth lens element 6 | Object-side surface 61 | 9.047 | -0.590 | 1.640 | 23.529 | 61.094 |
| | Image-side surface 62 | 7.545 | -0.431 | | | |
| Filter 9 | Object-side surface 91 | Infinite | -0.210 | 1.517 | 64.167 | |
| | Image-side surface 92 | Infinite | -0.325 | | | |
| | Image plane 100 | Infinite | | | | |

FIG. 20

| Surface | K | $a_2$ | $a_4$ | $a_6$ | $a_8$ |
|---|---|---|---|---|---|
| 31 | 0.000000E+00 | -2.329730E-05 | 4.453231E-03 | -4.625085E-03 | 2.748576E-03 |
| 32 | 0.000000E+00 | 7.588156E-03 | 0.000000E+00 | 0.000000E+00 | 0.000000E+00 |
| 41 | 0.000000E+00 | 1.359939E-02 | 1.253220E-04 | 0.000000E+00 | 0.000000E+00 |
| 42 | 0.000000E+00 | 1.371763E-02 | 1.251474E-03 | 6.704853E-04 | -3.150633E-04 |
| 51 | 0.000000E+00 | 5.487831E-02 | 6.114887E-02 | -4.150497E-02 | 1.340464E-02 |
| 52 | 0.000000E+00 | 1.217182E-02 | 1.025925E-01 | -7.803890E-02 | 3.301560E-02 |
| 61 | 0.000000E+00 | -5.762240E-02 | 2.731006E-02 | -1.206686E-02 | 3.825010E-03 |
| 62 | 0.000000E+00 | -2.620312E-04 | -3.544037E-03 | 3.883031E-04 | 0.000000E+00 |
| Surface | $a_{10}$ | $a_{12}$ | $a_{14}$ | | |
| 31 | -8.936887E-04 | 1.514907E-04 | -1.034398E-05 | | |
| 32 | 0.000000E+00 | 0.000000E+00 | 0.000000E+00 | | |
| 41 | 0.000000E+00 | 0.000000E+00 | 0.000000E+00 | | |
| 42 | 7.814234E-05 | 0.000000E+00 | 0.000000E+00 | | |
| 51 | -1.638053E-03 | 0.000000E+00 | 0.000000E+00 | | |
| 52 | -7.975334E-03 | 1.033560E-03 | -5.584186E-05 | | |
| 61 | -7.310804E-04 | 7.483280E-05 | -3.150976E-06 | | |
| 62 | 0.000000E+00 | 0.000000E+00 | 0.000000E+00 | | |

FIG. 21

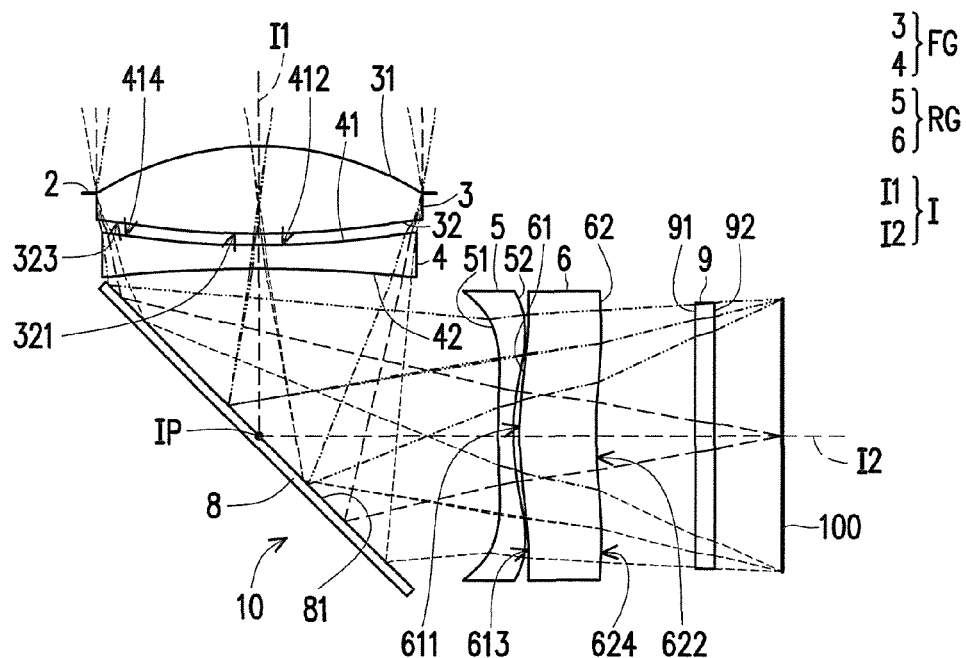
FIG. 22
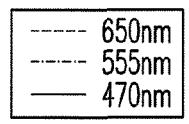
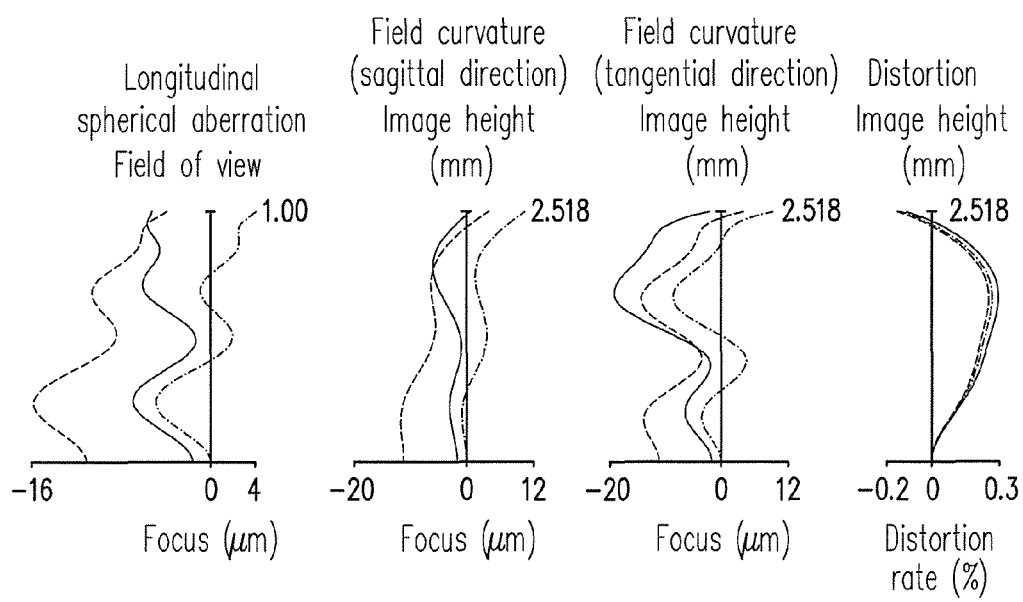
FIG. 23A    FIG. 23B    FIG. 23C    FIG. 23D

| Fifth embodiment |||||||
|---|---|---|---|---|---|---|
| Effective focal length=10.053 mm , Half field of view=14.013°, f-number=2.653, System length=8.700 mm, Image height=2.517 mm, Focal length of the front lens group=8.405 mm, Depth=5.891 mm |||||||
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.546 | | | |
| First lens element 3 | Object-side surface 31 | 3.523 | 1.015 | 1.535 | 55.690 | 4.879 |
| | Image-side surface 32 | -9.167 | 0.136 | | | |
| Second lens element 4 | Object-side surface 41 | -9.646 | 0.274 | 1.640 | 23.529 | -9.669 |
| | Image-side surface 42 | 17.810 | 1.959 | | | |
| Reflector 8 | Reflective surface 81 | Infinite | -2.780 | | | |
| Third lens element 5 | Object-side surface 51 | -10.595 | -0.179 | 1.545 | 55.987 | -8.262 |
| | Image-side surface 52 | -3.146 | -0.076 | | | |
| Fourth lens element 6 | Object-side surface 61 | -4.178 | -0.902 | 1.640 | 23.529 | 23.993 |
| | Image-side surface 62 | -5.240 | -1.164 | | | |
| Filter 9 | Object-side surface 91 | Infinite | -0.210 | 1.517 | 64.167 | |
| | Image-side surface 92 | Infinite | -0.800 | | | |
| | Image plane 100 | Infinite | | | | |

FIG. 24

| Surface | K | $a_2$ | $a_4$ | $a_6$ | $a_8$ |
|---|---|---|---|---|---|
| 31 | 0.000000E+00 | -1.056538E-03 | 7.225751E-04 | -6.991026E-04 | 3.580975E-04 |
| 32 | 0.000000E+00 | 2.336840E-03 | 0.000000E+00 | 0.000000E+00 | 0.000000E+00 |
| 41 | 0.000000E+00 | 2.285798E-03 | 2.758515E-06 | 0.000000E+00 | 0.000000E+00 |
| 42 | 0.000000E+00 | 5.223830E-04 | 2.792393E-04 | -1.146365E-04 | 2.494652E-05 |
| 51 | 0.000000E+00 | -5.734795E-03 | 7.429349E-02 | -3.954694E-02 | 1.181362E-02 |
| 52 | 0.000000E+00 | -1.317860E-02 | 9.127226E-02 | -5.809163E-02 | 2.345659E-02 |
| 61 | 0.000000E+00 | 4.181041E-02 | 1.289944E-04 | -3.226487E-03 | 9.959040E-04 |
| 62 | 0.000000E+00 | 5.229731E-02 | -1.079405E-02 | 9.827300E-04 | 0.000000E+00 |
| Surface | $a_{10}$ | $a_{12}$ | $a_{14}$ | | |
| 31 | -1.027069E-04 | 1.542743E-05 | -9.427447E-07 | | |
| 32 | 0.000000E+00 | 0.000000E+00 | 0.000000E+00 | | |
| 41 | 0.000000E+00 | 0.000000E+00 | 0.000000E+00 | | |
| 42 | -1.793448E-06 | 0.000000E+00 | 0.000000E+00 | | |
| 51 | -1.395177E-03 | 0.000000E+00 | 0.000000E+00 | | |
| 52 | -5.950389E-03 | 8.635121E-04 | -5.496452E-05 | | |
| 61 | -1.772266E-04 | 2.515115E-05 | -1.627821E-06 | | |
| 62 | 0.000000E+00 | 0.000000E+00 | 0.000000E+00 | | |

FIG. 25

| Sixth embodiment | | | | | | |
|---|---|---|---|---|---|---|
| Effective focal length=9.372 mm , Half field of view=14.999°, f-number=2.610, System length=8.770 mm, Image height=2.517 mm, Focal length of the front lens group=8.108 mm, Depth=5.902 mm | | | | | | |
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.649 | | | |
| First lens element 3 | Object-side surface 31 | 2.880 | 0.945 | 1.540 | 59.709 | 4.775 |
| | Image-side surface 32 | -22.378 | 0.114 | | | |
| Second lens element 4 | Object-side surface 41 | -33.736 | 0.283 | 1.661 | 20.412 | -9.662 |
| | Image-side surface 42 | 7.996 | 2.059 | | | |
| Reflector 8 | Reflective surface 81 | Infinite | -2.807 | | | |
| Third lens element 5 | Object-side surface 51 | -4.595 | -0.411 | 1.545 | 55.987 | -9.261 |
| | Image-side surface 52 | -2.332 | -0.548 | | | |
| Fourth lens element 6 | Object-side surface 61 | -55.916 | -0.770 | 1.640 | 23.529 | -332.950 |
| | Image-side surface 62 | -44.120 | -0.296 | | | |
| Filter 9 | Object-side surface 91 | Infinite | -0.210 | 1.517 | 64.167 | |
| | Image-side surface 92 | Infinite | -0.327 | | | |
| | Image plane 100 | Infinite | | | | |

FIG. 28

| Surface | K | $a_2$ | $a_4$ | $a_6$ | $a_8$ |
|---|---|---|---|---|---|
| 31 | 0.000000E+00 | -5.869431E-04 | 4.307322E-03 | -4.658368E-03 | 2.751677E-03 |
| 32 | 0.000000E+00 | 7.279931E-03 | 0.000000E+00 | 0.000000E+00 | 0.000000E+00 |
| 41 | 0.000000E+00 | 1.402968E-02 | 1.577602E-04 | 0.000000E+00 | 0.000000E+00 |
| 42 | 0.000000E+00 | 1.419332E-02 | 8.888090E-04 | 6.383935E-04 | -2.833158E-04 |
| 51 | 0.000000E+00 | 5.546584E-02 | 6.098890E-02 | -4.160784E-02 | 1.313212E-02 |
| 52 | 0.000000E+00 | 1.267200E-02 | 1.029176E-01 | -7.804397E-02 | 3.301080E-02 |
| 61 | 0.000000E+00 | -5.171272E-02 | 2.746932E-02 | -1.207891E-02 | 3.826710E-03 |
| 62 | 0.000000E+00 | 1.255691E-03 | -2.301878E-03 | 2.641908E-04 | 0.000000E+00 |
| Surface | $a_{10}$ | $a_{12}$ | $a_{14}$ | | |
| 31 | -8.932475E-04 | 1.512626E-04 | -1.034708E-05 | | |
| 32 | 0.000000E+00 | 0.000000E+00 | 0.000000E+00 | | |
| 41 | 0.000000E+00 | 0.000000E+00 | 0.000000E+00 | | |
| 42 | 6.685353E-05 | 0.000000E+00 | 0.000000E+00 | | |
| 51 | -1.569806E-03 | 0.000000E+00 | 0.000000E+00 | | |
| 52 | -7.976764E-03 | 1.034637E-03 | -5.604174E-05 | | |
| 61 | -7.324796E-04 | 7.465632E-05 | -3.118216E-06 | | |
| 62 | 0.000000E+00 | 0.000000E+00 | 0.000000E+00 | | |

FIG. 29

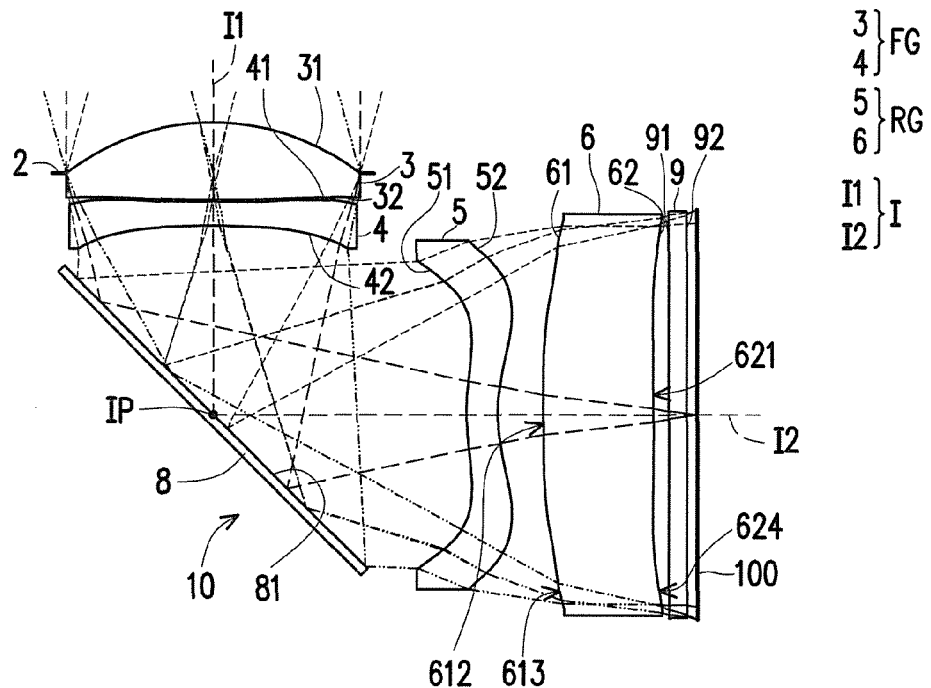
FIG. 30
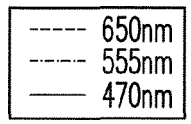
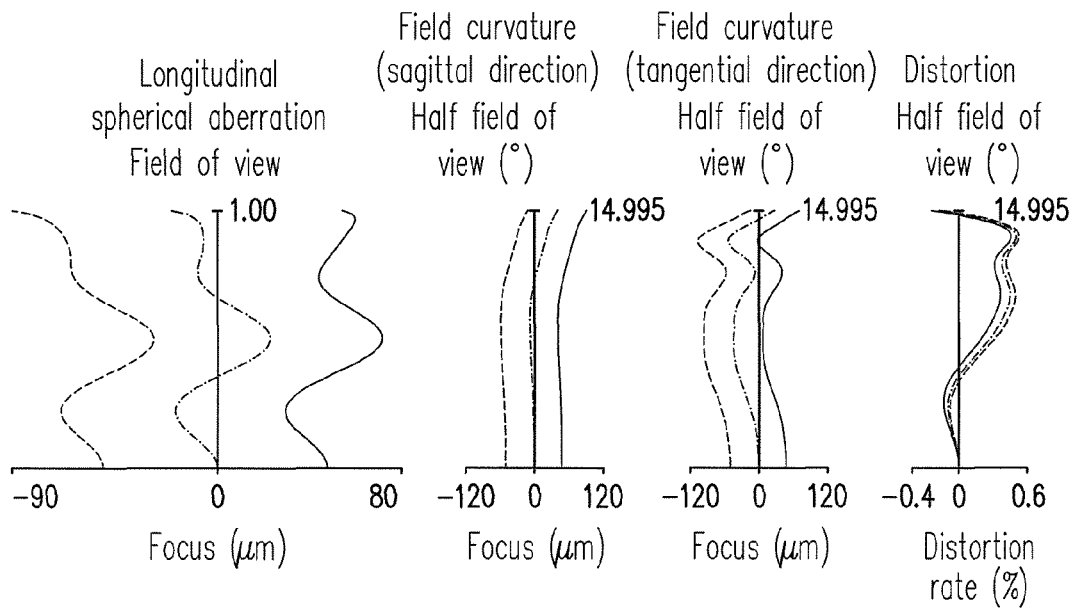
FIG. 31A   FIG. 31B   FIG. 31C   FIG. 31D

| Seventh embodiment |||||||
|---|---|---|---|---|---|---|
| Effective focal length=9.385 mm , Half field of view=14.995°, f-number=2.635, System length=9.490 mm, Image height=2.517 mm, Focal length of the front lens group=8.653 mm, Depth=6.074 mm |||||||
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.615 | | | |
| First lens element 3 | Object-side surface 31 | 3.035 | 0.941 | 1.544 | 49.922 | 4.735 |
| | Image-side surface 32 | -15.626 | 0.026 | | | |
| Second lens element 4 | Object-side surface 41 | -11.399 | 0.289 | 1.617 | 30.973 | -9.057 |
| | Image-side surface 42 | 11.177 | 2.321 | | | |
| Reflector 8 | Reflective surface 81 | Infinite | -3.090 | | | |
| Third lens element 5 | Object-side surface 51 | -3.653 | -0.379 | 1.545 | 55.987 | -15.640 |
| | Image-side surface 52 | -2.465 | -0.555 | | | |
| Fourth lens element 6 | Object-side surface 61 | 66.299 | -1.350 | 1.640 | 23.529 | 153.869 |
| | Image-side surface 62 | 40.054 | -0.194 | | | |
| Filter 9 | Object-side surface 91 | Infinite | -0.210 | 1.517 | 64.167 | |
| | Image-side surface 92 | Infinite | -0.132 | | | |
| | Image plane 100 | Infinite | | | | |

FIG. 32

| Surface | K | $a_2$ | $a_4$ | $a_6$ | $a_8$ |
|---|---|---|---|---|---|
| 31 | 0.000000E+00 | 1.134287E-03 | 4.273711E-03 | -4.685134E-03 | 2.740749E-03 |
| 32 | 0.000000E+00 | 7.483041E-03 | 0.000000E+00 | 0.000000E+00 | 0.000000E+00 |
| 41 | 0.000000E+00 | 1.395511E-02 | 8.142528E-04 | 0.000000E+00 | 0.000000E+00 |
| 42 | 0.000000E+00 | 1.436723E-02 | 1.651580E-03 | 6.602173E-04 | -3.043428E-04 |
| 51 | 0.000000E+00 | 5.228220E-02 | 6.054613E-02 | -4.162328E-02 | 1.317268E-02 |
| 52 | 0.000000E+00 | 1.145079E-02 | 1.031016E-01 | -7.796267E-02 | 3.302575E-02 |
| 61 | 0.000000E+00 | -5.007084E-02 | 2.755163E-02 | -1.208827E-02 | 3.823225E-03 |
| 62 | 0.000000E+00 | -1.373527E-03 | -2.176283E-03 | 2.690814E-04 | 0.000000E+00 |
| Surface | $a_{10}$ | $a_{12}$ | $a_{14}$ | | |
| 31 | -8.959534E-04 | 1.510765E-04 | -1.032204E-05 | | |
| 32 | 0.000000E+00 | 0.000000E+00 | 0.000000E+00 | | |
| 41 | 0.000000E+00 | 0.000000E+00 | 0.000000E+00 | | |
| 42 | 4.740219E-05 | 0.000000E+00 | 0.000000E+00 | | |
| 51 | -1.535537E-03 | 0.000000E+00 | 0.000000E+00 | | |
| 52 | -7.975524E-03 | 1.034194E-03 | -5.634482E-05 | | |
| 61 | -7.329671E-04 | 7.463468E-05 | -3.102973E-06 | | |
| 62 | 0.000000E+00 | 0.000000E+00 | 0.000000E+00 | | |

FIG. 33

| Eighth embodiment |||||||
|---|---|---|---|---|---|---|
| Effective focal length=10.047 mm, Half field of view=13.956°, |||||||
| f-number=2.800, System length=9.458 mm, Image height=2.517 mm, Focal |||||||
| length of the front lens group=8.317 mm, Depth=6.043 mm |||||||
| Lens element | Surface | Radius of curvature (mm) | Thickness (mm) | Index of refraction | Abbe number | Focal length (mm) |
| Object | | Infinite | 5001 | | | |
| Aperture stop 2 | | Infinite | -0.599 | | | |
| First lens element 3 | Object-side surface 31 | 3.108 | 0.938 | 1.535 | 55.690 | 4.763 |
| | Image-side surface 32 | -12.862 | 0.005 | | | |
| Second lens element 4 | Object-side surface 41 | -18.577 | 0.253 | 1.640 | 23.529 | -9.723 |
| | Image-side surface 42 | 9.509 | 2.260 | | | |
| Reflector 8 | Reflective surface 81 | Infinite | -2.782 | | | |
| Third lens element 5 | Object-side surface 51 | -5.339 | -0.416 | 1.545 | 55.987 | -11.335 |
| | Image-side surface 52 | -2.788 | -0.937 | | | |
| Fourth lens element 6 | Object-side surface 61 | 17.755 | -1.362 | 1.640 | 23.529 | -36.649 |
| | Image-side surface 62 | 73.625 | -0.050 | | | |
| Filter 9 | Object-side surface 91 | Infinite | -0.210 | 1.517 | 64.167 | |
| | Image-side surface 92 | Infinite | -0.245 | | | |
| | Image plane 100 | Infinite | | | | |

FIG. 36

| Conditional expression | First embodiment | Second embodiment | Third embodiment | Fourth embodiment |
| --- | --- | --- | --- | --- |
| T1 | 0.97 | 0.96 | 0.95 | 0.98 |
| G12 | 0.05 | 0.05 | 0.09 | 0.08 |
| T2 | 0.26 | 0.32 | 0.28 | 0.27 |
| G2C | 2.24 | 2.25 | 2.12 | 1.95 |
| GC3 | 3.01 | 2.93 | 2.81 | 2.96 |
| T3 | 0.31 | 0.30 | 0.41 | 0.42 |
| G34 | 0.54 | 0.68 | 0.91 | 0.79 |
| T4 | 0.83 | 1.12 | 1.32 | 0.59 |
| G4F | 0.13 | 0.16 | 0.16 | 0.43 |
| TF | 0.21 | 0.21 | 0.21 | 0.21 |
| GFP | 0.58 | 0.30 | 0.19 | 0.33 |
| ALT | 2.38 | 2.70 | 2.95 | 2.27 |
| AAG | 5.85 | 5.91 | 5.93 | 5.78 |
| TTL | 9.14 | 9.28 | 9.43 | 9.01 |
| fFG | 8.41 | 8.46 | 8.51 | 8.41 |
| EPD | 3.60 | 3.60 | 3.60 | 3.60 |
| ImaH | 2.52 | 2.52 | 2.52 | 2.52 |
| ImaH/(G12+T2) | 8.04 | 6.74 | 6.79 | 7.10 |
| v1-v2 | 32.16 | 32.16 | 32.16 | 32.16 |
| EFL/fFG | 1.19 | 1.19 | 1.18 | 1.19 |
| TTL/EFL | 0.91 | 0.93 | 0.94 | 0.90 |
| G23/EPD | 1.46 | 1.44 | 1.37 | 1.36 |
| T1/T2 | 3.70 | 2.98 | 3.41 | 3.62 |
| G34/(G12+T2) | 1.72 | 1.81 | 2.46 | 2.22 |
| G23/T2 | 19.99 | 16.04 | 17.66 | 18.07 |
| AAG/T2 | 22.23 | 18.29 | 21.26 | 21.27 |
| EFL/T2 | 38.16 | 31.02 | 36.16 | 36.91 |
| T1/G34 | 1.80 | 1.42 | 1.04 | 1.25 |
| ALT/G34 | 4.40 | 4.00 | 3.23 | 2.88 |
| G23/G34 | 9.74 | 7.67 | 5.39 | 6.24 |
| T3/G34 | 0.58 | 0.44 | 0.45 | 0.54 |
| T4/G34 | 1.53 | 1.66 | 1.44 | 0.75 |

FIG. 38

| Conditional expression | Fifth embodiment | Sixth embodiment | Seventh embodiment | Eighth embodiment |
|---|---|---|---|---|
| T1 | 1.01 | 0.95 | 0.94 | 0.94 |
| G12 | 0.14 | 0.11 | 0.03 | 0.00 |
| T2 | 0.27 | 0.28 | 0.29 | 0.25 |
| G2C | 1.96 | 2.06 | 2.32 | 2.26 |
| GC3 | 2.78 | 2.81 | 3.09 | 2.78 |
| T3 | 0.18 | 0.41 | 0.38 | 0.42 |
| G34 | 0.08 | 0.55 | 0.56 | 0.94 |
| T4 | 0.90 | 0.77 | 1.35 | 1.36 |
| G4F | 1.16 | 0.30 | 0.19 | 0.05 |
| TF | 0.21 | 0.21 | 0.21 | 0.21 |
| GFP | 0.80 | 0.33 | 0.13 | 0.24 |
| ALT | 2.37 | 2.41 | 2.96 | 2.97 |
| AAG | 4.95 | 5.53 | 5.99 | 5.98 |
| TTL | 9.49 | 8.77 | 9.49 | 9.46 |
| fFG | 8.41 | 8.11 | 8.65 | 8.32 |
| EPD | 3.80 | 3.60 | 3.60 | 3.60 |
| ImaH | 2.52 | 2.52 | 2.52 | 2.52 |
| ImaH/(G12+T2) | 6.14 | 6.34 | 8.00 | 9.75 |
| v1-v2 | 32.16 | 39.30 | 18.95 | 32.16 |
| EFL/fFG | 1.20 | 1.15 | 1.08 | 1.21 |
| TTL/EFL | 0.94 | 0.94 | 1.01 | 0.94 |
| G23/EPD | 1.25 | 1.35 | 1.50 | 1.40 |
| T1/T2 | 3.70 | 3.34 | 3.26 | 3.70 |
| G34/(G12+T2) | 0.19 | 1.38 | 1.77 | 3.63 |
| G23/T2 | 17.28 | 17.20 | 18.75 | 19.90 |
| AAG/T2 | 18.05 | 19.54 | 20.77 | 23.61 |
| EFL/T2 | 36.66 | 32.94 | 32.53 | 39.64 |
| T1/G34 | 13.27 | 1.72 | 1.69 | 1.00 |
| ALT/G34 | 31.00 | 4.39 | 5.33 | 3.17 |
| G23/G34 | 62.00 | 8.87 | 9.74 | 5.38 |
| T3/G34 | 2.34 | 0.75 | 0.68 | 0.44 |
| T4/G34 | 11.80 | 1.40 | 2.43 | 1.45 |

FIG. 39

OPTICAL IMAGING LENS

CROSS-REFERENCE TO RELATED APPLICATION

This application claims the priority benefit of China application serial no. 201610725556.6, filed on Aug. 25, 2016. The entirety of the above-mentioned patent application is hereby incorporated by reference herein and made a part of this specification.

BACKGROUND OF THE INVENTION

Field of the Invention

The invention relates to an optical imaging lens.

Description of Related Art

In recent years, the popularity of mobile products such as mobile phones and digital cameras allowed the rigorous development of imaging module-related techniques, and the imaging module mainly contains elements such as an optical imaging lens, a module holder unit, and a sensor, and the thin and light developing trend of mobile phones and digital cameras also resulted in a greater demand of the compactness of the imaging module. With the advancement of the techniques of charge-coupled device (CCD) and complementary metal oxide semiconductor (CMOS) and reduction in size, the length of the optical imaging lens installed in the imaging module also needs to be correspondingly reduced. However, to prevent reduction in photographic effects and quality, when the length of the optical imaging lens is reduced, good optical performance still needs to be achieved. The most important feature of the optical imaging lens is expectedly imaging quality and size.

Specifications of mobile products (such as mobile phones, cameras, tablet computers, personal digital assistants, automotive video devices, and virtual reality trackers) are ever changing, and the key component thereof, the optical imaging lens, is also being more dynamically developed, and the application not only covers photography and video recording, but also includes, for instance, environmental monitoring and driving records recording, and with the advancement of image sensing techniques, consumer demand for, for instance, imaging quality is also increased.

However, the optical imaging lens design cannot produce an optical imaging lens having both imaging quality and small size simply by reducing the ratio of, for instance, a lens having good imaging quality, and the design process involves material properties, and actual issues on the production line such as assembly yield also needs to be considered.

The technical difficulty of manufacturing a small lens is significantly greater than that of a traditional lens, and therefore how to manufacture an optical imaging lens satisfying consumer electronic product requirements and continuing to increase the imaging quality thereof have always been highly desired goals of production, government, and academia in the field.

Moreover, the larger the focal length of an optical imaging lens, the larger the magnification of the optical imaging lens. As a result, the length of a telephoto lens is hard to reduce. The dilemma of reducing lens length or increasing the magnification and maintaining the imaging quality cause the design of the optical imaging lens to be hard.

SUMMARY OF THE INVENTION

The invention provides an optical imaging lens capable of maintaining good optical performance under the condition of a reduced lens depth.

An embodiment of the invention provides an optical imaging lens including a front lens group and a rear lens group from an object side to an image side in order along an optical axis. The optical axis includes a first optical axis and a second optical axis not coinciding with the first optical axis. The front lens group includes a first lens element and a second lens element from the object side to the image side in order along the first optical axis. The rear lens group includes a third lens element and a fourth lens element from the object side to the image side in order along the second optical axis. The first lens element to the fourth lens element each comprise an object-side surface facing the object side and allowing imaging rays to pass through and an image-side surface facing the image side and allowing the imaging rays to pass through. The first lens element has positive refracting power, and the second lens element has negative refracting power. At least one of the object-side surface and the image-side surface of the third lens element is an aspheric surface. At least one of the object-side surface and the image-side surface of the fourth lens element is an aspheric surface. A maximum distance between the image-side surface of the first lens element and the object-side surface of the second lens element in a direction parallel to the first optical axis is less than 0.2 mm. The optical imaging lens satisfies: $6.1 \leq \text{ImaH}/(G12+T2)$, where ImaH is an image height of the optical imaging lens, G12 is an air gap from the first lens element to the second lens element on the first optical axis, and T2 is a thickness of the second lens element on the first optical axis.

An embodiment of the invention provides an optical imaging lens including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The first lens element has positive refracting power. The second lens element has negative refracting power. At least one of the object-side surface and the image-side surface of the third lens element is an aspheric surface. At least one of the object-side surface and the image-side surface of the fourth lens element is an aspheric surface. A maximum distance between the image-side surface of the first lens element and the object-side surface of the second lens element in a direction parallel to the optical axis is less than 0.2 mm. The optical imaging lens satisfies: $6.1 \leq \text{ImaH}/(G12+T2)$; and $1.2 \leq G23/\text{EPD}$, where ImaH is an image height of the optical imaging lens, G12 is an air gap from the first lens element to the second lens element on the optical axis, T2 is a thickness of the second lens element on the optical axis, G23 is an air gap from the second lens element to the third lens element on the optical axis, and EPD is a diameter of an entrance pupil of the optical imaging lens.

Based on the above, the optical imaging lens of the embodiments of the invention has the following beneficial effects: via the conditional expression and the arrangement of the object-side surface or the image-side surface of the lens elements, under the condition of a reduced system length or lens depth, the optical imaging lens still has the optical performance of being capable of overcoming aberrations and provides good imaging quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic describing the surface structure of the lens element of example 1.

FIG. 4 is a schematic describing the surface structure of the lens element of example 2.

FIG. 5 is a schematic describing the surface structure of the lens element of example 3.

FIG. 8 shows detailed optical data of the optical imaging lens of the first embodiment of the invention.

FIG. 9 shows aspheric surface parameters of the optical imaging lens of the first embodiment of the invention.

FIG. 12 shows detailed optical data of the optical imaging lens of the second embodiment of the invention.

FIG. 13 shows aspheric surface parameters of the optical imaging lens of the second embodiment of the invention.

FIG. 16 shows detailed optical data of the optical imaging lens of the third embodiment of the invention.

FIG. 17 shows aspheric surface parameters of the optical imaging lens of the third embodiment of the invention.

FIG. 20 shows detailed optical data of the optical imaging lens of the fourth embodiment of the invention.

FIG. 21 shows aspheric surface parameters of the optical imaging lens of the fourth embodiment of the invention.

FIG. 22 is a schematic of an optical imaging lens of the fifth embodiment of the invention.

FIG. 23A to FIG. 23D are diagrams of the longitudinal spherical aberration and various aberrations of the optical imaging lens of the fifth embodiment.

FIG. 24 shows detailed optical data of the optical imaging lens of the fifth embodiment of the invention.

FIG. 25 shows aspheric surface parameters of the optical imaging lens of the fifth embodiment of the invention.

FIG. 28 shows detailed optical data of the optical imaging lens of the sixth embodiment of the invention.

FIG. 29 shows aspheric surface parameters of the optical imaging lens of the sixth embodiment of the invention.

FIG. 30 is a schematic of an optical imaging lens of the seventh embodiment of the invention.

FIG. 31A to FIG. 31D are diagrams of the longitudinal spherical aberration and various aberrations of the optical imaging lens of the seventh embodiment.

FIG. 32 shows detailed optical data of the optical imaging lens of the seventh embodiment of the invention.

FIG. 33 shows aspheric surface parameters of the optical imaging lens of the seventh embodiment of the invention.

FIG. 36 shows detailed optical data of the optical imaging lens of the eighth embodiment of the invention.

FIG. 38 and FIG. 39 show the numeric values of various important parameters and relationship formulas thereof of the optical imaging lens elements of the first to eighth embodiments of the invention.

DESCRIPTION OF THE EMBODIMENTS

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
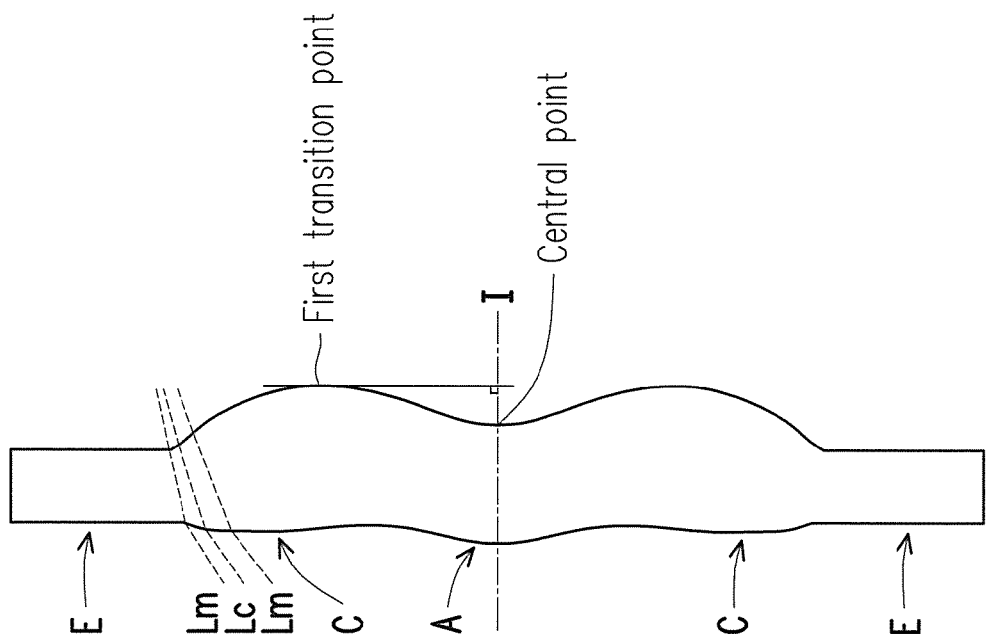
FIG. 1 is a schematic describing the surface structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
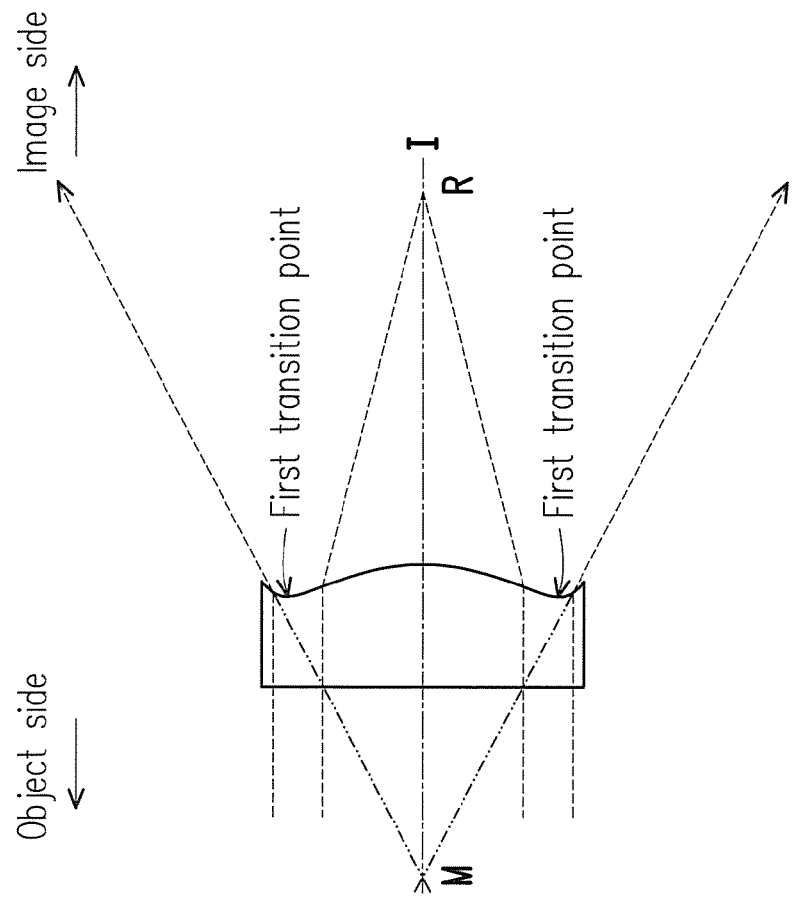
FIG. 2 is a schematic describing the surface concave and convex structure and the ray focus of a lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens element surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
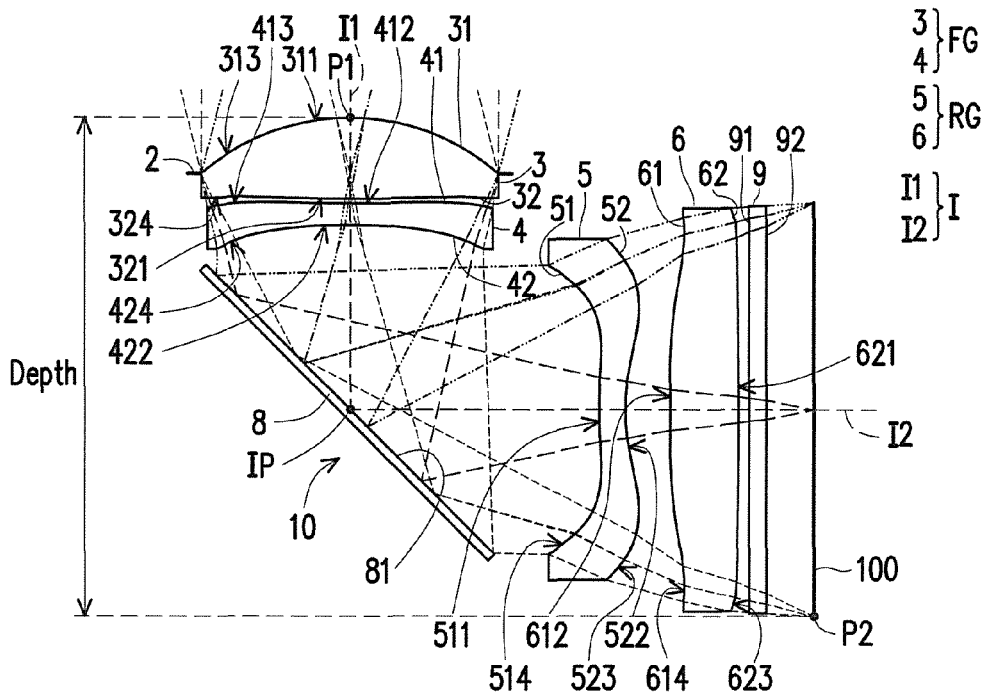
FIG. 6 is a schematic of an optical imaging lens of the first embodiment of the invention.

FIG. 6 is a schematic of an optical imaging lens of the first embodiment of the invention, and FIG. 7A to FIG. 7D are diagrams of the longitudinal spherical aberration and various aberrations of the optical imaging lens of the first embodiment. Referring first to FIG. 6, the optical imaging lens 10 of the first embodiment of the invention includes an aperture stop 2, a first lens element 3, a second lens element 4, a reflector 8, a third lens element 5, a fourth lens element 6 and a filter 9 from the object side to the image side in order along an optical axis I of optical the imaging lens 10. When rays emitted by an object to be photographed enter the optical imaging lens 10 and pass through the aperture stop 2, the first lens element 3, and the second lens element 4, are reflected by the reflector 8, and pass through the third lens element 5, the fourth lens element 6, and the filter 9 in sequence, an image is formed on an image plane 100. The filter 9 is, for instance, an infrared cut-off filter configured to block infrared in rays emitted by the object. It should be added that, the object side is a side facing the object to be photographed and the image side is a side facing the image plane 100.

In this embodiment, the optical imaging lens 10 includes a front lens group FG and a rear lens group RG from the object side to the image side in order along the optical axis I. The optical axis I includes a first optical axis I1 and a second optical axis I2 not coinciding with the first optical axis I1. In this embodiment, the optical axis I is bent by the reflective surface 81 of the reflector 8. The first optical axis I1 is the portion of the optical axis I before bent by the reflector 8, and the second optical axis I2 is the other portion of the optical axis I after bent by the reflector 8. A ray transmitted along the first optical axis I1 is reflected by the reflective surface 81 and then transmitted along the second optical axis I2. The front lens group FG includes the first lens element 3 and the second lens element 4 from the object side to the image side in order along the first optical axis I1. The rear lens group RG includes the third lens element 5 and the fourth lens element 6 from the object side to the image side in order along the second optical axis I2. In this embodiment, the reflector 8 is a mirror. However, in other embodiments, the reflector 8 may be a prism or any other appropriate reflective element.

The first lens element 3, the second lens element 4, the third lens element 5, the fourth lens 6, and the filter 9 all each have an object-side surface 31, 41, 51, 61, 91 facing the object side and allowing the imaging rays to pass through and an image-side surface 32, 42, 52, 62, 92 facing the image side and allowing the imaging rays to pass through.

In this embodiment, to meet the demand for a light product, the first lens element 3 to the fourth lens element 6 all have refracting power, and the first lens element 3, the second lens element 4, the third lens element 5, and the fourth lens element 6 are all made of a plastic material, but the materials of the first lens element 3 to the fourth lens element 6 are not limited thereto.

The first lens element 3 has positive refracting power. The object-side surface 31 of the first lens element 3 is a convex surface and has a convex portion 311 in a vicinity of the optical axis I and a convex portion 313 in a vicinity of a periphery of the first lens element 3. The image-side surface 32 of the first lens element 3 has a convex portion 321 in a vicinity of the optical axis I and a concave portion 324 in a vicinity of the periphery of the first lens element 3.

The second lens element 4 has negative refracting power. The object-side surface 41 of the second lens element 4 has a concave portion 412 in a vicinity of the optical axis I and a convex portion 413 in a vicinity of a periphery of the second lens element 4. The image-side surface 42 of the second lens element 4 is a concave surface and has a concave portion 422 in a vicinity of the optical axis I and a concave portion 424 in a vicinity of a periphery of the second lens element 4.

The third lens element 5 has negative refracting power. The object-side surface 51 of the third lens element 5 has a convex portion 511 in a vicinity of the optical axis I and a concave portion 514 in a vicinity of a periphery of the third lens element 5. The image-side surface 52 of the third lens element 5 has a concave portion 522 in a vicinity of the optical axis I and a convex portion 523 in a vicinity of the periphery of the third lens element 5.

The fourth lens element 6 has negative refracting power. The object-side surface 61 of the fourth lens element 6 has a concave portion 612 in a vicinity of the optical axis I and a concave portion 614 in a vicinity of a periphery of the fourth lens element 6. The image-side surface 62 is a convex surface and has a convex portion 621 in a vicinity of the optical axis I and a convex portion 623 in a vicinity of the periphery of the fourth lens element 6.

In addition, only the aforementioned lens elements have refracting power, and the quantity of the lens elements having refracting power of the optical imaging lens 10 is only four.

The other detailed optical data of the first embodiment is as shown in FIG. 8, and in the first embodiment, the effective focal length (EFL) of the optical imaging lens 10 is 10.036 mm, the half field of view (HFOV) thereof is 14.046°, the f-number (Fno) thereof is 2.800, the system length (TTL) thereof is 9.143 mm, the image height (ImaH) thereof is 2.517 mm, the focal length (fFG) of the front lens group FG thereof is 8.405 mm, and the lens depth (Depth) thereof is 6.043 mm. In particular, the system length refers to the distance from the object-side surface 31 of the first lens element 3 to the image plane 100 on the optical axis I. The lens depth, Depth, refers to a distance in a direction of the first optical axis I1 from a first position P1 of the object-side surface 31 of the first lens element 3 intersecting the first optical axis I1 to a second position P2 of the optical imaging lens 10 farthest away from the first position P1 in the direction of the first optical axis I1. The second position P2 may be located on the bottom edge in the figure of the reflector 8, the third lens element 5, the fourth lens element 6, the filter 9, or the image plane 100 as long as this position is farthest away from the first position P1 in the direction of the first optical axis I1. In this embodiment, the second position P2 may be located on the bottom edge in the figure of the image plane 100.

In this embodiment, the included angle between the normal of the reflective surface 81 and the first optical axis I1 is 45°, and the included angle between the normal of the reflective surface 81 and the second optical axis I2 is 45°. The normal of the reflective surface 81, the first optical axis I1, and the second optical axis I2 are coplanar, and the included angle between the first optical axis I1 and the second optical axis I2 is 90°. However, in other embodiments, the included angle between the first optical axis I1 and the second optical axis I2 may be less than 90° or larger than 90°.

Moreover, in the present embodiment, the eight surfaces of the object-side surfaces 31, 41, 51, and 61 and the image-side surfaces 32, 42, 52, and 62 of the first lens element 3, the second lens element 4, the third lens element 5, and the fourth lens element 6 are all aspheric surfaces, and the aspheric surfaces are defined according to the following general formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \qquad (1)$$

wherein:

Y: distance between a point on the aspheric surface curve and the optical axis I;

Z: depth (perpendicular distance between the point on the aspheric surface that is spaced by the distance Y from the optical axis I and a tangent plane tangent to the vertex of the aspheric surface on the optical axis I) of the aspheric surface;

R: radius of curvature of the lens element surface in a vicinity of the optical axis I;

K: conic constant;

$a_i$: i-th aspheric surface coefficient.

Each of the aspheric coefficients of the object-side surfaces 31, 41, 51, and 61 and the image-side surfaces 32, 42, 52, and 62 in general formula (1) is as shown in FIG. 9. In particular, column number 31 in FIG. 9 represents the aspheric coefficient of the object-side surface 31 of the first lens element 3, and the other column fields are defined in a similar manner.

Moreover, the relationship between each of the important parameters in the optical imaging lens 10 of the first embodiment is as shown in FIG. 38.

wherein,

T1 is the thickness of the first lens element 3 on the optical axis I, i.e., on the first optical axis I1;

T2 is the thickness of the second lens element 4 on the optical axis I, i.e., on the first optical axis I1;

T3 is the thickness of the third lens element 5 on the optical axis I, i.e., on the second optical axis I2;

T4 is the thickness of the fourth lens element 6 on the optical axis I, i.e., on the second optical axis I2;

TF is the thickness of the filter 9 on the optical axis I, i.e., on the second optical axis I2;

G12 is the distance from the image-side surface 32 of the first lens element 3 to the object-side surface 41 of the second lens element 4 on the optical axis I, i.e. an air gap from the first lens element 3 to the second lens element 4 on the first optical axis I1;

G2C is the distance on the first optical axis from the second lens element 4 to the intersection point IP of the first optical axis I1 and the second optical axis I2;

GC3 is the distance on the second optical axis from the intersection point IP of the first optical axis I1 and the second optical axis I2 to the third lens element 5; G23 is the distance from the image-side surface 42 of the second lens element 4 to the object-side surface 51 of the third lens element 5 on the optical axis I, i.e. an air gap from the second lens element 4 to the third lens element 5 on the optical axis I, and i.e. the sum of G2C and GC3;

G34 is the distance from the image-side surface 52 of the third lens element 5 to the object-side surface 61 of the fourth lens element 6 on the optical axis I, i.e. an air gap from the third lens element 5 to the fourth lens element 6 on the second optical axis I2;

G4F is the distance from the image-side surface 62 of the fourth lens element 6 to the object-side surface 91 of the filter 9 on the optical axis I, i.e. an air gap from the fourth lens element 6 to the filter 9 on the second optical axis I2;

GFP is the distance from the image-side surface 92 of the filter 9 to the image plane 100 on the optical axis I, i.e. an air gap from the filter 9 to the image plane 100 on the second optical axis I2;

AGG is the sum of three air gaps from the first lens element 3 to the fourth lens element 6 on the optical axis I, i.e., the sum of G12, G23, and G34;

ALT is the sum of the thicknesses of the first lens element 3, the second lens element 4, the third lens element 5, and the fourth lens element 6 on the optical axis I, i.e., the sum of T1, T2, T3, and T4;

TTL is the distance from the object-side surface 31 of the first lens element 3 to the image plane 100 on the optical axis I, i.e. the distance on the first optical axis I1 from the object-side surface 31 of the first lens element 3 to the intersection point IP of the first optical axis I1 and the second optical axis I2 plus the distance on the second optical axis I2 from the intersection point IP to the image plane 100;

BFL is the distance from the image-side surface 62 of the fourth lens element 6 to the image plane 100 on the optical axis I, i.e., on the second optical axis I2;

EFL is the effective focal length of the optical imaging lens 10;

EPD is a diameter of an entrance pupil of the optical imaging lens 10;

ImaH is an image height of the optical imaging lens 10; and

Depth is a distance in a direction of the first optical axis I1 from a first position P1 of the object-side surface 31 of the first lens element 3 intersecting the first optical axis I1 to a second position P2 of the optical imaging lens 10 farthest away from the first position P1 in the direction of the first optical axis I1.

Moreover, the following are further defined:

f1 is the focal length of the first lens element 3;

f2 is the focal length of the second lens element 4;

f3 is the focal length of the third lens element 5;

f4 is the focal length of the fourth lens element 6;

fFG is the focal length of the front lens group FG;

n1 is the index of refraction of the first lens element 3;

n2 is the index of refraction of the second lens element 4;

n3 is the index of refraction of the third lens element 5;

n4 is the index of refraction of the fourth lens element 6;

ν1 is the Abbe number of the first lens element 3, and the Abbe number can also be referred to as the coefficient of dispersion;

ν2 is the Abbe number of the second lens element 4;

ν3 is the Abbe number of the third lens element 5; and

ν4 is the Abbe number of the fourth lens element 6.

Figures 7A, 7B, 7C, 7D:
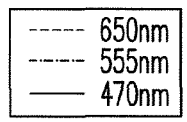
FIG. 7A to FIG. 7D are diagrams of the longitudinal spherical aberration and various aberrations of the optical imaging lens of the first embodiment.

Referring further to FIG. 7A to FIG. 7D, FIG. 7A describes longitudinal spherical aberration of the first embodiment when the pupil radius thereof is 1.8000 mm, FIG. 7B and FIG. 7C respectively describe the field curvature in the sagittal direction and the field curvature in the tangential direction on the image plane 100 of the first embodiment when the wavelengths thereof are 650 nm, 555 nm, and 470 nm, and FIG. 7D describes the distortion aberration on the image plane 100 of the first embodiment when the wavelengths thereof are 650 nm, 555 nm, and 470 nm. In the longitudinal spherical aberration figure of FIG. 7A of the first embodiment, the curves formed by various wavelengths are all very close and are in a vicinity of the center, indicating the off-axis rays at different heights of each wavelength are all concentrated in a vicinity of the imaging point, and it can be seen from the deflection amplitude of the curve of each wavelength that, the imaging point deviation of the off-axis rays at different heights is controlled within the range of ±40 microns, and therefore in the present embodiment, the spherical aberration of the same wavelength is indeed significantly improved. Moreover, the distances between the three representative wavelengths are also relative close, indicating the imaging positions of different wavelength rays are relatively concentrated, and therefore the chromatic aberration is also significantly improved.

In the two field curvature figures of FIG. 7B and FIG. 7C, the focal length variation amount of three representative wavelengths in the entire field of view is within ±35 microns, indicating that the optical system of the first embodiment can effectively eliminate aberrations. The distortion aberration figure of FIG. 7D shows the distortion aberration of the first embodiment is maintained within the range of ±0.41%, indicating the distortion aberration of the first embodiment satisfies the imaging quality requirements of the optical system, and as a result, in comparison to the current optical lens, in the first embodiment, under the condition that the lens depth is reduced to about 6.043 mm, good imaging quality can still be provided. Therefore, in the first embodiment, under the condition of maintaining good optical performance, the lens depth can be reduced and the effective focal length of the optical imaging lens 10 can be increased to achieve a telephoto effect.

Figure 10:
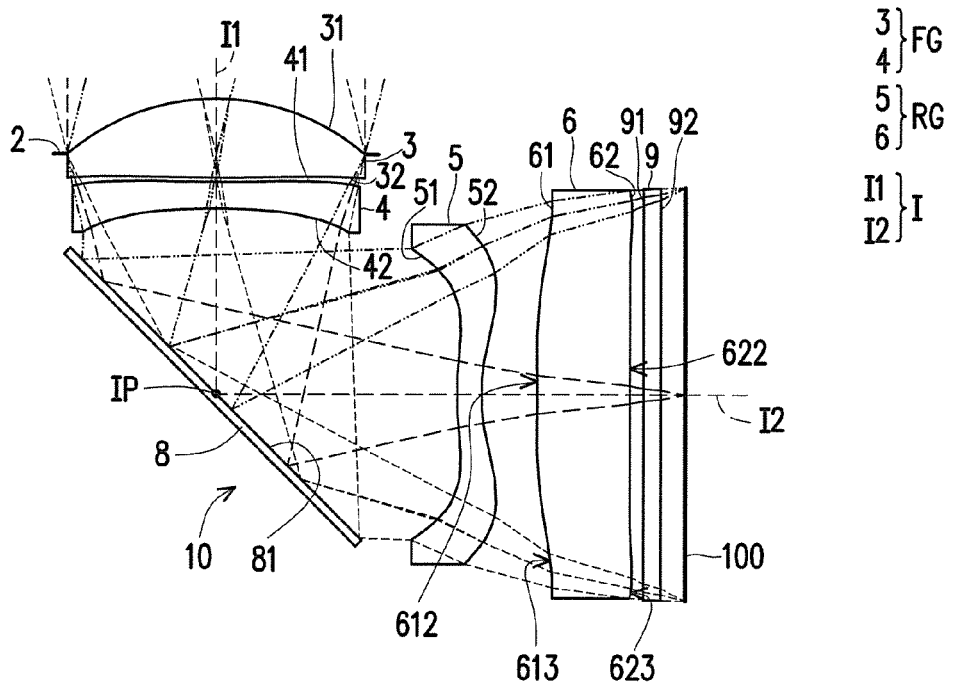
FIG. 10 is a schematic of an optical imaging lens of the second embodiment of the invention.

FIG. 10 is a schematic of an optical imaging lens of the second embodiment of the invention, and FIG. 11A to FIG. 11D are diagrams of the longitudinal spherical aberration and various aberrations of the optical imaging lens of the second embodiment. Referring first to FIG. 10, the second embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the object-side surface 61 of the fourth lens element 6 has a concave portion 612 in a vicinity of the optical axis I and a convex portion 613 in a vicinity of a periphery of the fourth lens element 6. In addition, the image-side surface 62 of the fourth lens element 6 has a concave portion 622 in a vicinity of the optical axis I and a convex portion 623 in a vicinity of a periphery of the fourth lens element 6. It should be mentioned here that, to clearly show the figure, in FIG. 10, a portion of the reference numerals of the same concave portion and convex portion as the first embodiment is omitted.

The detailed optical data of the optical imaging lens 10 is as shown in FIG. 12, and in the second embodiment, the EFL of the optical imaging lens 10 is 10.025 mm, the HFOV thereof is 14.069°, the Fno thereof is 2.800, the TTL thereof is 9.285 mm, the ImaH thereof is 2.517 mm, the fFG thereof is 8.456 mm, and the Depth thereof is 6.043 mm.

FIG. 13 shows each of the aspheric coefficients of the object-side surfaces 31, 41, 51, and 61 and the image-side surfaces 32, 42, 52, and 62 of the second embodiment in general formula (1).

Moreover, the relationship between each of the important parameters in the optical imaging lens 10 of the second embodiment is as shown in FIG. 38.

Figures 11A, 11B, 11C, 11D:
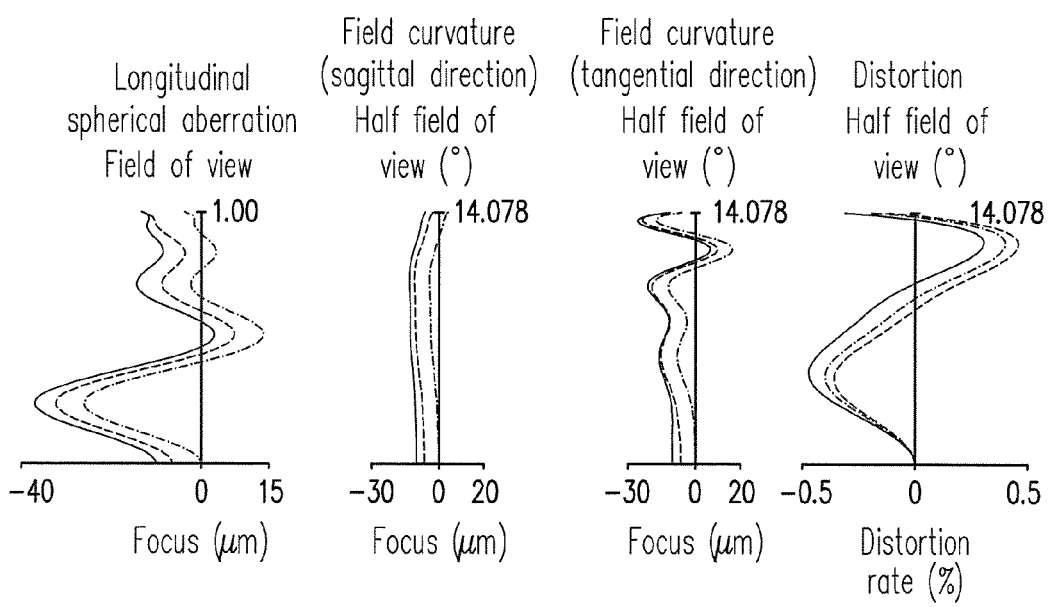
FIG. 11A to FIG. 11D are diagrams of the longitudinal spherical aberration and various aberrations of the optical imaging lens of the second embodiment.

In the longitudinal spherical aberration figure of FIG. 11A of the second embodiment in the condition that the pupil radius thereof is 1.8000 mm, the imaging point deviation of off-axis rays at different heights is controlled to be within the range of ±40 microns. In the two field curvature figures of FIG. 11B and FIG. 11C, the focal length variation amount of three representative wavelengths in the entire field of view is within ±27 microns. The distortion aberration figure of FIG. 11D shows that the distortion aberration of the second embodiment is maintained within the range of ±0.5%. Accordingly, in comparison to the current optical lens, in the second embodiment, good imaging quality can still be provided under the condition of the lens depth reduced to about 6.043 mm.

It can be known from the above that, the advantages of the second embodiment in comparison to the first embodiment are: the longitudinal aberration of the second embodiment is less than that of the first embodiment, and the field curvature of the second embodiment is less than that of the first embodiment.

Figure 14:
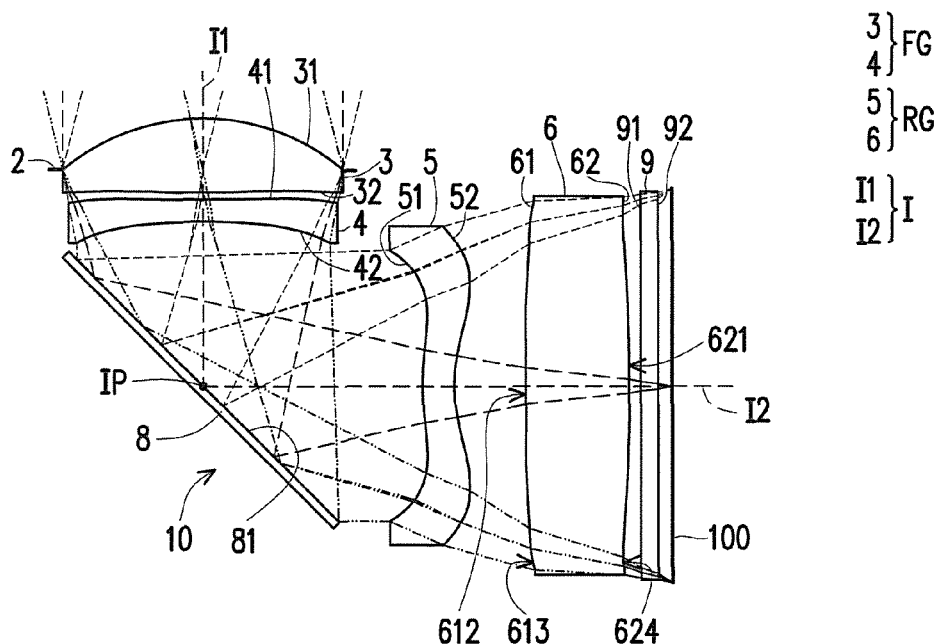
FIG. 14 is a schematic of an optical imaging lens of the third embodiment of the invention.

FIG. 14 is a schematic of an optical imaging lens of the third embodiment of the invention, and FIG. 15A to FIG. 15D are diagrams of the longitudinal spherical aberration and various aberrations of the optical imaging lens of the third embodiment. Referring first to FIG. 14, the third embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the object-side surface 61 of the fourth lens element 6 has a concave portion 612 in a vicinity of the optical axis I and a convex portion 613 in a vicinity of a periphery of the fourth lens element 6. The image-side surface 62 of the fourth lens element 6 has a convex portion 621 in a vicinity of the optical axis I and a concave portion 624 in a vicinity of a periphery of the fourth lens element 6. It should be mentioned here that, to clearly show the figure, in FIG. 14, a portion of reference numerals of the same concave portion and convex portion as the first embodiment is omitted.

The detailed optical data of the optical imaging lens 10 is as shown in FIG. 16, and in the third embodiment, the EFL of the optical imaging lens 10 is 10.079 mm, the HFOV thereof is 14.008°, the Fno thereof is 2.801, the TTL thereof is 9.434 mm, the ImaH thereof is 2.517 mm, the fFG thereof is 8.51 mm, and the Depth thereof is 5.920 mm.

FIG. 17 shows each of the aspheric coefficients of the object-side surfaces 31, 41, 51, and 61 and the image-side surfaces 32, 42, 52, and 62 of the third embodiment in general formula (1).

Moreover, the relationship between each of the important parameters in the optical imaging lens 10 of the third embodiment is as shown in FIG. 38.

Figures 15A, 15B, 15C, 15D:
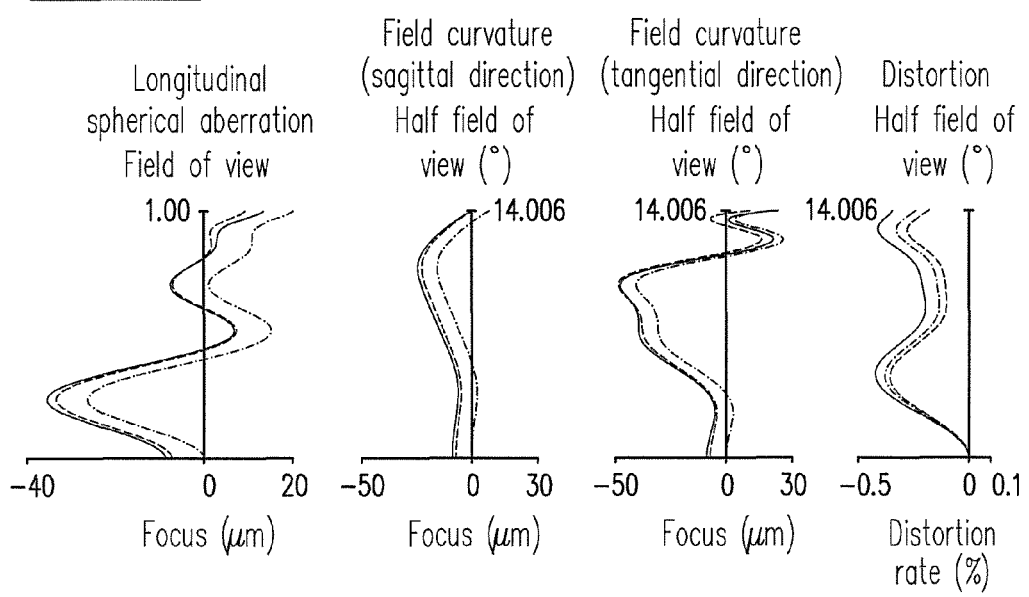
FIG. 15A to FIG. 15D are diagrams of the longitudinal spherical aberration and various aberrations of the optical imaging lens of the third embodiment.

In the longitudinal spherical aberration figure of FIG. 15A of the third embodiment in the condition that the pupil radius thereof is 1.8000 mm, the imaging point deviation of off-axis rays at different heights is controlled to be within the range of ±37 microns. In the two field curvature figures of FIG. 15B and FIG. 15C, the focal length variation amount of three representative wavelengths in the entire field of view is within ±50 microns. The distortion aberration figure of FIG. 15D shows that the distortion aberration of the third embodiment is maintained within the range of ±0.45%. Accordingly, in comparison to the current optical lens, in the third embodiment, good imaging quality can still be provided under the condition of the lens depth reduced to about 5.920 mm.

It can be known from the above that, advantages of the third embodiment in comparison to the first embodiment are: the lens depth of the optical imaging lens 10 of the third embodiment is smaller than that of the first embodiment; the HFOV of the third embodiment is less than that of the first embodiment, which improves the telephoto effect; the longitudinal spherical aberration of the third embodiment is less than that of the first embodiment; and the third embodiment is easier to manufacture than the first embodiment since the thickness difference of the lens elements between the vicinity of the optical axis I and the vicinity of the periphery is less, and therefore the yield is higher.

Figure 18:
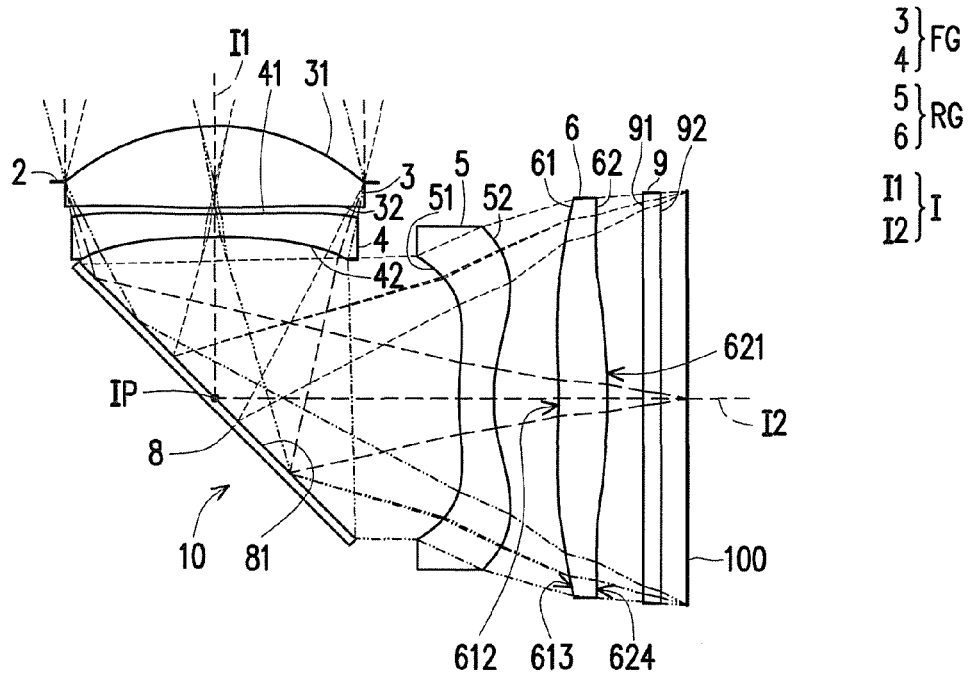
FIG. 18 is a schematic of an optical imaging lens of the fourth embodiment of the invention.

FIG. 18 is a schematic of an optical imaging lens of the fourth embodiment of the invention, and FIG. 19A to FIG. 19D are diagrams of the longitudinal spherical aberration and various aberrations of the optical imaging lens of the fourth embodiment. Referring first to FIG. 18, the fourth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the fourth lens element 6 has positive refracting power. The object-side surface 61 of the fourth lens element 6 has a concave portion 612 in a vicinity of the optical axis I and a convex portion 613 in a vicinity of a periphery of the fourth lens element 6. In addition, in this embodiment, the image-side surface 62 of the fourth lens element 6 has a convex portion 621 in a vicinity of the optical axis I and a concave portion 624 in a vicinity of a periphery of the fourth lens element 6. It should be mentioned here that, to clearly show the figure, in FIG. 18, a portion of reference numerals of the same concave portion and convex portion as the first embodiment is omitted.

The detailed optical data of the optical imaging lens 10 is as shown in FIG. 20, and in the fourth embodiment, the EFL of the optical imaging lens 10 is 10.021 mm, the HFOV thereof is 14.044°, the Fno thereof is 2.800, the TTL thereof is 9.009 mm, the ImaH thereof is 2.517 mm, the fFG thereof is 8.405 mm, and the Depth thereof is 5.772 mm.

FIG. 21 shows each of the aspheric coefficients of the object-side surfaces 31, 41, 51, and 61 and the image-side surfaces 32, 42, 52, and 62 of the fourth embodiment in general formula (1).

Moreover, the relationship between each of the important parameters in the optical imaging lens 10 of the fourth embodiment is as shown in FIG. 38.

Figures 19A, 19B, 19C, 19D:
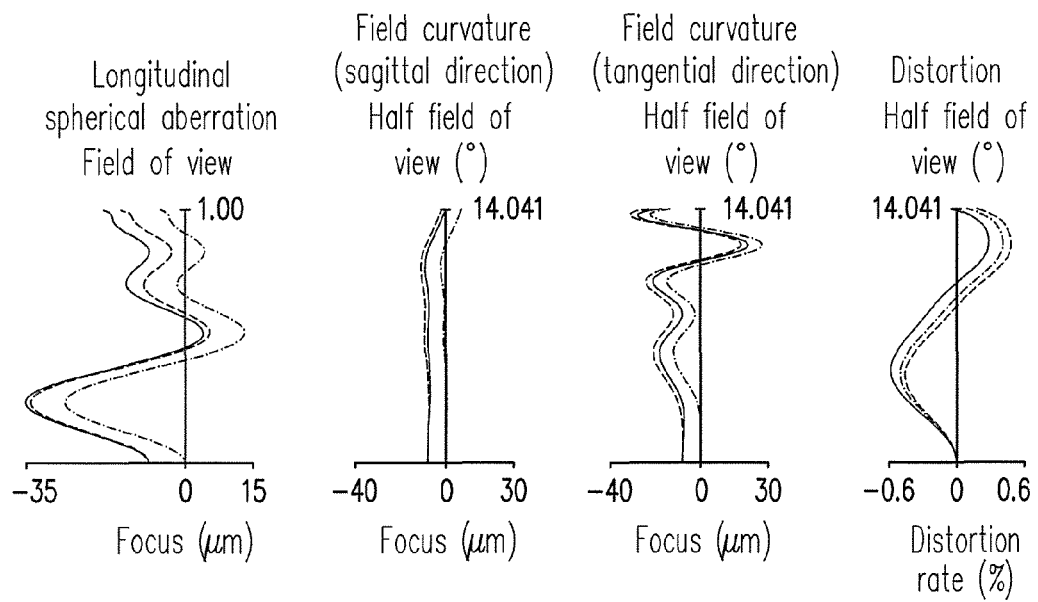
FIG. 19A to FIG. 19D are diagrams of the longitudinal spherical aberration and various aberrations of the optical imaging lens of the fourth embodiment.

In the longitudinal spherical aberration figure of FIG. 19A of the fourth embodiment in the condition that the pupil radius thereof is 1.8000 mm, the imaging point deviation of off-axis rays at different heights is controlled to be within the range of +36 microns. In the two field curvature figures of FIG. 19B and FIG. 19C, the focal length variation amount of three representative wavelengths in the entire field of view is within ±35 microns. The distortion aberration figure of FIG. 19D shows that the distortion aberration of the fourth embodiment is maintained within the range of ±0.6%. Accordingly, in comparison to the current optical lens, in the fourth embodiment, good imaging quality can still be provided under the condition of the lens depth reduced to about 5.772 mm.

It can be known from the above that, the advantages of the fourth embodiment in comparison to the first embodiment are: the lens depth of the optical imaging lens 10 of the fourth embodiment is less than that of the first embodiment; the HFOV of the fourth embodiment is less than that of the first embodiment, which improves the telephoto effect; and the longitudinal spherical aberration of the fourth embodiment is less than that of the first embodiment.

FIG. 22 is a schematic of an optical imaging lens of the fifth embodiment of the invention, and FIG. 23A to FIG. 23D are diagrams of the longitudinal spherical aberration and various aberrations of the optical imaging lens of the fifth embodiment. Referring first to FIG. 22, the fifth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the fourth lens element 6 has positive refracting power. The image-side surface 32 of the first lens element 3 is a convex surface, and has a convex portion 321 in a vicinity of the optical axis I and a convex portion 323 in a vicinity of the periphery of the first lens element 3. The object-side surface 41 of the second lens element 4 is a concave surface, and has a concave portion 412 in a vicinity of the optical axis I and a concave portion 414 in a vicinity of a periphery of the second lens element 4. The object-side surface 61 of the fourth lens element 6 is a convex surface, and has a convex portion 611 in a vicinity of the optical axis I and a convex portion 613 in a vicinity of a periphery of the fourth lens element 6. The image-side surface 62 of the fourth lens element 6 is a concave surface, and has a concave portion 622 in a vicinity of the optical axis I and a concave portion 624 in a vicinity of a periphery of the fourth lens element 6. It should be mentioned here that, to clearly show the figure, in FIG. 22, a portion of reference numerals of the same concave portion and convex portion as the first embodiment is omitted.

The detailed optical data of the optical imaging lens 10 is as shown in FIG. 24, and in the fifth embodiment, the EFL of the optical imaging lens 10 is 10.053 mm, the HFOV thereof is 14.013°, the Fno thereof is 2.653, the TTL thereof is 8.700 mm, the ImaH thereof is 2.517 mm, the fFG thereof is 8.405 mm, and the Depth thereof is 5.891 mm.

FIG. 25 shows each of the aspheric coefficients of the object-side surfaces 31, 41, 51, and 61 and the image-side surfaces 32, 42, 52, and 62 of the fifth embodiment in general formula (1).

Moreover, the relationship between each of the important parameters in the optical imaging lens 10 of the fifth embodiment is as shown in FIG. 39.

In the longitudinal spherical aberration figure of FIG. 23A of the fifth embodiment in the condition that the pupil radius thereof is 1.9000 mm, the imaging point deviation of off-axis rays at different heights is controlled to be within the range of ±16 microns. In the two field curvature figures of FIG. 23B and FIG. 23C, the focal length variation amount of three representative wavelengths in the entire field of view is within ±20 microns. The distortion aberration figure of FIG. 23D shows that the distortion aberration of the fifth embodiment is maintained within the range of +0.3%. Accordingly, in comparison to the current optical lens, in the fifth embodiment, good imaging quality can still be provided under the condition of the lens depth reduced to about 5.891 mm.

It can be known from the above that, advantages of the fifth embodiment in comparison to the first embodiment are: the lens depth of the optical imaging lens 10 of the fifth embodiment is smaller than that of the first embodiment; the f-number of the fifth embodiment is less than that of the first embodiment; the HFOV of the fifth embodiment is less than that of the first embodiment, which improves the telephoto effect; the longitudinal spherical aberration of the fifth embodiment is less than that of the first embodiment; the field curvature of the fifth embodiment is less than that of the first embodiment; and the distortion of the fifth embodiment is less than that of the first embodiment.

Figure 26:
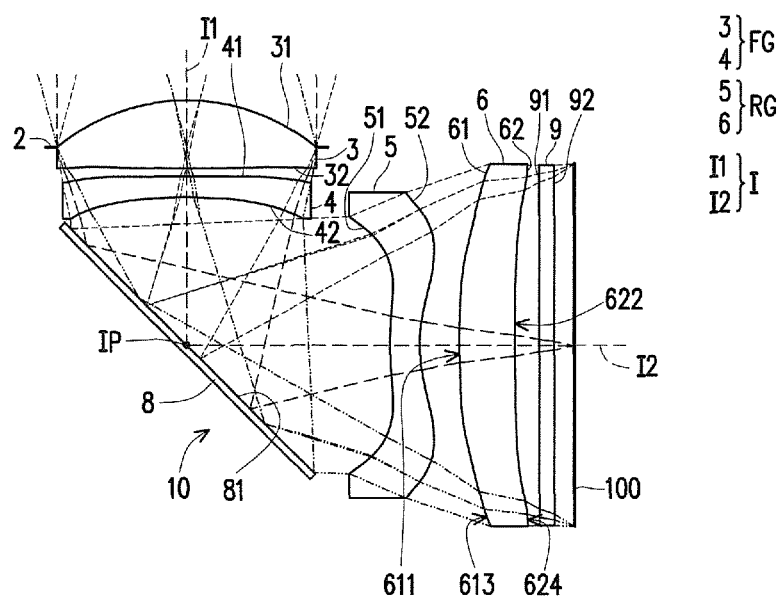
FIG. 26 is a schematic of an optical imaging lens of the sixth embodiment of the invention.

FIG. 26 is a schematic of an optical imaging lens of the sixth embodiment of the invention, and FIG. 27A to FIG. 27D are diagrams of the longitudinal spherical aberration and various aberrations of the optical imaging lens of the sixth embodiment. Referring first to FIG. 26, the sixth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the object-side surface 61 of the fourth lens element 6 is a convex surface and has a convex portion 611 in a vicinity of the optical axis I and a convex portion 613 in a vicinity of a periphery of the fourth lens element 6. In addition, in this embodiment, the image-side surface 62 of the fourth lens element 6 is a concave surface, and has a concave portion 622 in a vicinity of the optical axis I and a concave portion 624 in a vicinity of a periphery of the fourth lens element 6. It should be mentioned here that, to clearly show the figure, in FIG. 26, a portion of reference numerals of the same concave portion and convex portion as the first embodiment is omitted.

The detailed optical data of the optical imaging lens 10 is as shown in FIG. 28, and in the sixth embodiment, the EFL of the optical imaging lens 10 is 9.372 mm, the HFOV thereof is 14.999°, the Fno thereof is 2.610, the TTL thereof is 8.770 mm, the ImaH thereof is 2.517 mm, the fFG thereof is 8.108 mm, and Depth thereof is 5.902 mm.

FIG. 29 shows each of the aspheric coefficients of the object-side surfaces 31, 41, 51, and 61 and the image-side surfaces 32, 42, 52, and 62 of the sixth embodiment in general formula (1).

Moreover, the relationship between each of the important parameters in the optical imaging lens 10 of the sixth embodiment is as shown in FIG. 39.

Figures 27A, 27B, 27C, 27D:
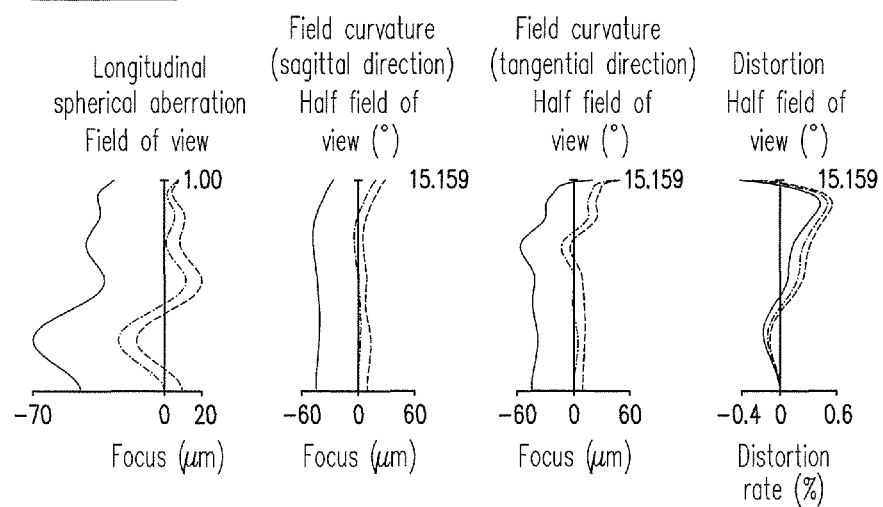
FIG. 27A to FIG. 27D are diagrams of the longitudinal spherical aberration and various aberrations of the optical imaging lens of the sixth embodiment.

In the longitudinal spherical aberration figure of FIG. 27A of the sixth embodiment in the condition that the pupil radius thereof is 1.8000 mm, the imaging point deviation of off-axis rays at different heights is controlled to be within the range of ±70 microns. In the two field curvature figures of FIG. 27B and FIG. 27C, the focal length variation amount of three representative wavelengths in the entire field of view is within ±60 microns. The distortion aberration figure of FIG. 27D shows that the distortion aberration of the sixth embodiment is maintained within the range of ±0.6%. Accordingly, in comparison to the current optical lens, in the sixth embodiment, good imaging quality can still be provided under the condition of the lens depth reduced to about 5.902 mm.

It can be known from the above that, advantages of the sixth embodiment in comparison to the first embodiment are: the lens depth of the sixth embodiment is less than that of the first embodiment; and the f-number of the sixth embodiment is less than that of the first embodiment.

FIG. 30 is a schematic of an optical imaging lens of the seventh embodiment of the invention, and FIG. 31A to FIG. 31D are diagrams of the longitudinal spherical aberration and various aberrations of the optical imaging lens of the seventh embodiment. Referring first to FIG. 30, the seventh embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the fourth lens element 6 has positive refracting power. The object-side surface 61 of the fourth lens element 6 has a concave portion 612 in a vicinity of the optical axis I and a convex portion 613 in a vicinity of a periphery of the fourth lens element 6. In addition, in this embodiment, the image-side surface 62 of the fourth lens element 6 has a convex portion 621 in a vicinity of the optical axis I and a concave portion 624 in a vicinity of a periphery of the fourth lens element 6. It should be mentioned here that, to clearly show the figure, in FIG. 30, a portion of reference numerals of the same concave portion and convex portion as the first embodiment is omitted.

The detailed optical data of the optical imaging lens 10 is as shown in FIG. 32, and in the seventh embodiment, the EFL of the optical imaging lens 10 is 9.385 mm, the HFOV thereof is 14.995°, the Fno thereof is 2.635, the TTL thereof is 9.490 mm, the ImaH thereof is 2.517 mm, the fFG thereof is 8.653 mm, and the Depth thereof is 6.074 mm.

FIG. 33 shows each of the aspheric coefficients of the object-side surfaces 31, 41, 51, and 61 and the image-side surfaces 32, 42, 52, and 62 of the seventh embodiment in general formula (1).

Moreover, the relationship between each of the important parameters in the optical imaging lens 10 of the seventh embodiment is as shown in FIG. 39.

In the longitudinal spherical aberration figure of FIG. 31A of the seventh embodiment in the condition that the pupil radius thereof is 1.8000 mm, the imaging point deviation of off-axis rays at different heights is controlled to be within the range of ±90 microns. In the two field curvature figures of FIG. 31B and FIG. 31C, the focal length variation amount of three representative wavelengths in the entire field of view is within ±110 microns. The distortion aberration figure of FIG. 31D shows that the distortion aberration of the seventh embodiment is maintained within the range of ±0.55%. Accordingly, in comparison to the current optical lens, in the seventh embodiment, good imaging quality can still be provided under the condition of the lens depth reduced to about 6.074 mm.

It can be known from the above that, the advantages of the seventh embodiment in comparison to the first embodiment are: the f-number of the optical imaging lens 10 of the seventh embodiment is less than that of the first embodiment, and the seventh embodiment is easier to manufacture than the first embodiment since the thickness difference of the lens elements between the vicinity of the optical axis I and the vicinity of the periphery is less, and therefore the yield is higher.

Figure 34:
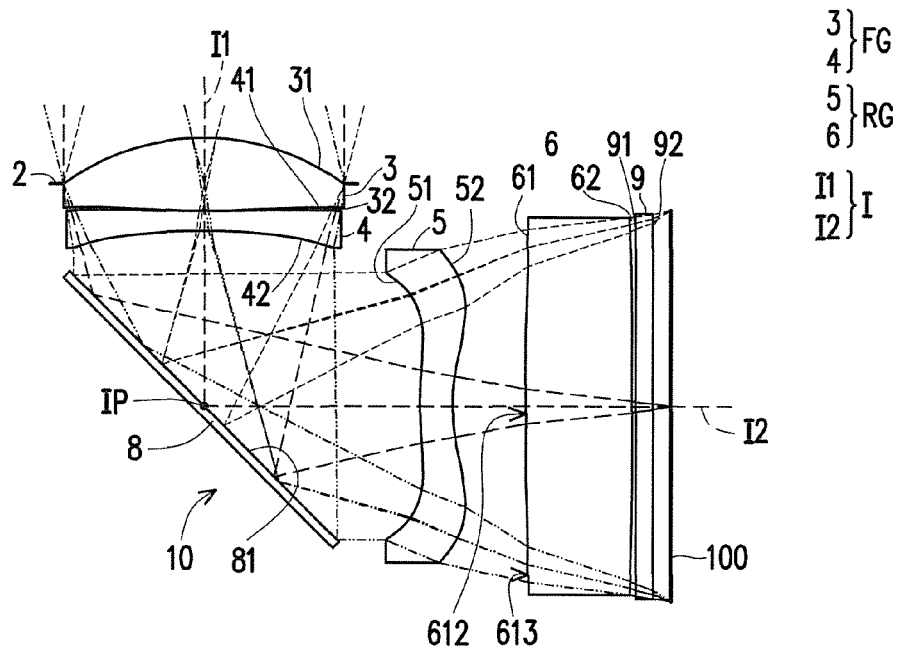
FIG. 34 is a schematic of an optical imaging lens of the eighth embodiment of the invention.

FIG. 34 is a schematic of an optical imaging lens of the eighth embodiment of the invention, and FIG. 35A to FIG. 35D are diagrams of the longitudinal spherical aberration and various aberrations of the optical imaging lens of the eighth embodiment. Referring first to FIG. 34, the eighth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the object-side surface 61 of the fourth lens element 6 has a concave portion 612 in a vicinity of the optical axis I and a convex portion 613 in a vicinity of a periphery of the fourth lens element 6. It should be mentioned here that, to clearly show the figure, in FIG. 34, a portion of reference numerals of the same concave portion and convex portion as the first embodiment is omitted.

The detailed optical data of the optical imaging lens 10 is as shown in FIG. 36, and in the eighth embodiment, the EFL of the optical imaging lens 10 is 10.047 mm, the HFOV thereof is 13.956°, the Fno thereof is 2.800, the TTL thereof is 9.458 mm, the ImaH thereof is 2.517 mm, the fFG thereof is 8.317 mm, and the Depth thereof is 6.043 mm.

Figure 37:
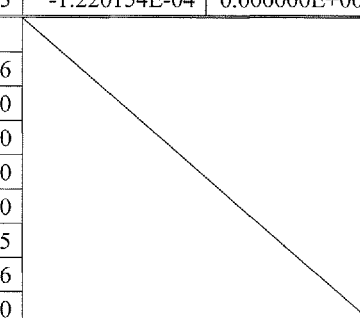
FIG. 37 shows aspheric surface parameters of the optical imaging lens of the eighth embodiment of the invention.

FIG. 37 shows each of the aspheric coefficients of the object-side surfaces 31, 41, 51, and 61 and the image-side surfaces 32, 42, 52, and 62 of the eighth embodiment in general formula (1).

Moreover, the relationship between each of the important parameters in the optical imaging lens 10 of the eighth embodiment is as shown in FIG. 39.

Figures 35A, 35B, 35C, 35D:
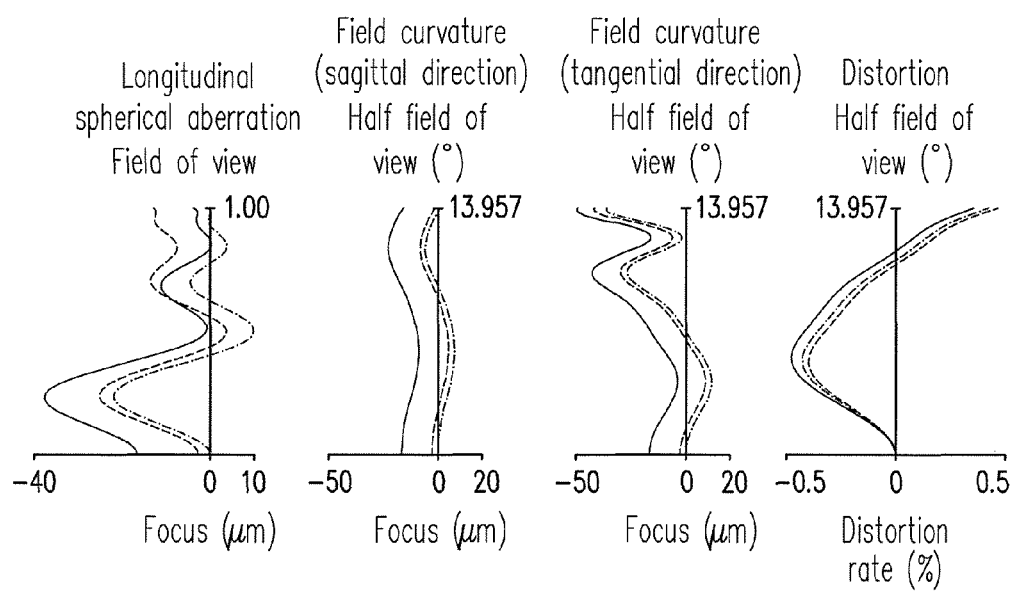
FIG. 35A to FIG. 35D are diagrams of the longitudinal spherical aberration and various aberrations of the optical imaging lens of the eighth embodiment.

In the longitudinal spherical aberration figure of FIG. 35A of the eighth embodiment in the condition that the pupil radius thereof is 1.8000 mm, the imaging point deviation of off-axis rays at different heights is controlled to be within the range of ±38 microns. In the two field curvature figures of FIG. 35B and FIG. 35C, the focal length variation amount of three representative wavelengths in the entire field of view is within ±50 microns. The distortion aberration figure of FIG. 35D shows that the distortion aberration of the eighth embodiment is maintained within the range of ±0.5%. Accordingly, in comparison to the current optical lens, in the eighth embodiment, good imaging quality can still be provided under the condition of the lens depth reduced to about 6.043 mm.

It can be known from the above that, advantages of the eighth embodiment in comparison to the first embodiment are: the HFOV of the eighth embodiment is smaller than that of the first embodiment, which improves the telephoto effect; the longitudinal spherical aberration of the eighth embodiment is less than that of the first embodiment; and the eighth embodiment is easier to manufacture than the first embodiment since the thickness difference of the lens elements between the vicinity of the optical axis I and the vicinity of the periphery is less, and therefore the yield is higher.

FIG. 38 and FIG. 39 shows tables of each optical parameter of the eight embodiments. When the relationship formula between each optical parameter in the optical imaging lens 10 of the embodiments of the invention satisfies at least one of the following condition formulas, the designer can design an optical imaging lens having good optical performance and a reduced overall length or lens depth and being technically applicable:

1. The first lens element 3 has positive refracting power, the image-side surface 32 of the first lens element 3 has a convex portion 321 in the vicinity of the optical axis I, the second lens element 4 has negative refracting power, the object-side surface 41 of the second lens element 4 has a concave portion 412 in the vicinity of the optical axis I, the maximum distance between the image-side surface 32 of the first lens element 3 and the object-side surface 41 of the second lens element 4 in a direction parallel to the optical axis I (e.g. the first optical axis I1) is less than 0.2 mm, and the optical imaging lens 10 satisfies $18 \leq v1-v2 \leq 50$, which makes the first lens element 3 and the second lens element 4 form a similar-cemented lens that may reduce spherical aberration, lateral chromatic aberration, and longitudinal chromatic aberration. The design of the similar-cemented lens reduces the value of G12+T2. When the first optical axis I1 is perpendicular to the second optical axis I2, the lens depth is related to T1+G12+T2+G2C and ImaH. If the optical imaging lens 10 satisfies $6.1 \leq \text{ImaH}/(G12+T2)$, when the lens depth is reduced, the image height is not too small and the size of image is thus not affected, or G12+T2 is not too long. Therefore, the embodiments of the invention both reduce the aberration and have the unexpected result of reducing the lens depth. Preferably, $6.1 \leq \text{ImaH}/(G12+T2) \leq 15$, so that the image height is not too large and the lens depth is thus not affected, or G12+T2 is not too small and the lens production is not affected. When the first optical axis I1 is perpendicular to the second optical axis I2, the lens depth is less than or equal to 6.1 mm. If the included angle between the first optical axis I1 and the second optical axis I2 is less than 90°, the lens depth may be less than or equal to 5.5 mm.

2. In order to divide the optical imaging lens 10 into the front lens group FG and the rear lens group RG and add the reflector 8 to bend the optical axis I, the air gap between the second lens element 4 and the third lens element 5 may satisfy $1.2 \leq G23/\text{EPD}$, so that there is enough space between the second lens element 4 and the third lens element 5 to dispose the reflector 8 so as to reflect rays. Preferably, $1.2 \leq G23/\text{EPD} \leq 2.4$, so that GC3 is not too large and the volume of the optical imaging lens 10 is thus not affected. Besides, the optical imaging lens 10 may further satisfies $1 \leq \text{EFL}/\text{fFG} \leq 2$ and $T1/T2 \leq 3.7$, so that the focal lengths of the first lens element 3 and the second lens element 4 are not too large, and the focal length of the front lens group FG is not too short, which facilitate the disposition of the reflector 8.

3. The optical imaging lens 10 may satisfy $\text{HFOV} \leq 25°$ and $\text{TTL}/\text{EFL} \leq 1.01$, which facilitate the design of telephoto magnification, and also prevent ImaH from being too large, so that the lens depth is not affected.

4. At least one of the object-side surface 51 and the image-side surface 52 of the third lens element 5 has a transition point, which facilitate correcting the main aberration due to the first lens element 3 and the second lens element 4. The optical imaging lens 10 may satisfy at least one of $G34/(G12+T2) \leq 4.3$, $G23/T2 \leq 20$, $\text{AAG}/T2 \leq 26$, $\text{EFL}/T2 \leq 40$, $1 \leq T1/G34 \leq 32$, $2 \leq \text{ALT}/G34 \leq 31$, $4 \leq G23/G34 \leq 62$, $0.44 \leq T3/G34 \leq 6.4$, and $0.75 \leq T4/G34 \leq 11.8$. Preferably, the optical imaging lens 10 may satisfy at least one of $0.1 \leq G34/(G12+T2) \leq 4.3$, $7.2 \leq G23/T2 \leq 20$, $7.8 \leq \text{AAG}/T2 \leq 26$, and $16 \leq \text{EFL}/T2 \leq 40$, so that the thicknesses of the lens elements and the air gaps among the lens elements may be maintained to be appropriate values. As a result, any parameter is prevented to be too large, and the miniaturization of the whole optical imaging lens 10 is thus not adversely affected. Alternatively, any parameter is prevented to be too small, and the assembly is thus not affected, or the difficulty in production is thus not increased.

However, based on the unpredictability of the optical system design, under the designs of the embodiments of the invention, by satisfying the above condition formulas, in the embodiments of the invention, lens length can be reduced, usable aperture is increased, field of view is increased, and imaging quality is increased, or assembly yield is increased such that the drawbacks of the prior art are reduced.

Based on the above, the optical imaging lens 10 of the embodiments of the invention may also achieve the following efficacies and advantages:

1. The longitudinal spherical aberration, the field curvature, and the distortion of each embodiment of the invention all satisfy usage criteria. Moreover, the three representative wavelengths of 650 nm, 555 nm, and 470 nm are all concentrated in a vicinity of the imaging point at different heights of off-axis rays, and it can be seen from the deflection amplitude of each curve that the imaging point deviations at different heights of the off-axis rays can all achieve control and have good spherical aberration, aberration, and distortion control capability. Referring further to the imaging quality data, the distances between the three representative wavelengths of 650 nm, 555 nm, and 470 nm are also relatively close, indicating that the concentration of rays having different wavelengths under various states in the embodiments of the invention is good and excellent dispersion reduction capability is achieved, and therefore it can be known from the above that the embodiments of the invention have good optical performance.

2. In addition, the aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional convex portion on the object-side surface in the vicinity of the optical axis of the first lens element. It should be noted that the above-described details can be optionally combined and applied to the other embodiments of the invention under the condition where they are not in conflict with one another.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical imaging lens comprising a front lens group and a rear lens group from an object side to an image side in order along an optical axis, the optical axis comprising a first optical axis and a second optical axis not coinciding with the first optical axis, the front lens group comprising a first lens element and a second lens element from the object side to the image side in order along the first optical axis, the rear lens group comprising a third lens element and a fourth lens element from the object side to the image side in order along the second optical axis, wherein the first lens element to the fourth lens element each comprise an object-side surface facing the object side and allowing imaging rays to pass through and an image-side surface facing the image side and allowing the imaging rays to pass through, and wherein the first lens element is arranged to be a lens element having refracting power in a first order from the object side to the image side, the second lens element is arranged to be a lens element having refracting power in a second order from the object side to the image side, the third lens element is arranged to be a lens element having refracting power in a second order from the image side to the object side, and the fourth lens element is arranged to be a lens element having refracting power in a first order from the image side to the object side;

the first lens element has positive refracting power;
the second lens element has negative refracting power;
at least one of the object-side surface and the image-side surface of the third lens element is an aspheric surface; and
at least one of the object-side surface and the image-side surface of the fourth lens element is an aspheric surface,
wherein a maximum distance between the image-side surface of the first lens element and the object-side surface of the second lens element in a direction parallel to the first optical axis is less than 0.2 mm, and the optical imaging lens satisfies:

$6.1 \leq ImaH/(G12+T2)$, $T1/T2 \leq 3.7$; and $0.75 \leq T4/G34 \leq 11.8$, where ImaH is an image height of the optical imaging lens, G12 is an air gap from the first lens element to the second lens element on the first optical axis, T2 is a thickness of the second lens element on the first optical axis, T1 is a thickness of the first lens element on the optical axis, T4 is a thickness of the fourth lens element on the optical axis, and G34 is an air gap from the third lens element to the fourth lens element on the optical axis.

2. The optical imaging lens of claim 1, wherein the optical imaging lens further satisfies: $18 \leq v1-v2 \leq 50$, where v1 is an Abbe number of the first lens element, and v2 is an Abbe number of the second lens element.

3. The optical imaging lens of claim 1, wherein the image-side surface of the first lens element has a convex portion in a vicinity of the optical axis.

4. The optical imaging lens of claim 1, wherein the object-side surface of the second lens element has a concave portion in a vicinity of the optical axis.

5. The optical imaging lens of claim 1, wherein the optical imaging lens further satisfies: $1 \leq EFL/fFG \leq 2$, where EFL is an effective focal length of the optical imaging lens, and fFG is a focal length of the front lens group.

6. The optical imaging lens of claim 1, wherein the optical imaging lens further satisfies: $HFOV \leq 25°$, where HFOV is a half field of view of the optical imaging lens.

7. The optical imaging lens of claim 1, wherein the optical imaging lens further satisfies: $TTL/EFL \leq 1.01$, where TTL is a distance from the object-side surface of the first lens element to an image plane of the optical imaging lens on the optical axis, and EFL is an effective focal length of the optical imaging lens.

8. The optical imaging lens of claim 1, wherein the optical imaging lens further satisfies: $Depth \leq 6.1$ mm, where Depth is a distance in a direction of the first optical axis from a first position of the object-side surface of the first lens element intersecting the first optical axis to a second position of the optical imaging lens farthest away from the first position in the direction of the first optical axis.

9. The optical imaging lens of claim 1, wherein at least one of the object-side surface and the image-side surface of the third lens element has a transition point.

10. An optical imaging lens comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through, and wherein the first lens element is arranged to be a lens element having refracting power in a first order from the object side to the image side, the second lens element is arranged to be a lens element having refracting power in a second order from the object side to the image side, the third lens element is arranged to be a lens element having refracting power in a second order from the image side to the object side, and the fourth lens element is arranged to be a lens element having refracting power in a first order from the image side to the object side;

the first lens element has positive refracting power;
the second lens element has negative refracting power;
at least one of the object-side surface and the image-side surface of the third lens element is an aspheric surface; and
at least one of the object-side surface and the image-side surface of the fourth lens element is an aspheric surface,
wherein a maximum distance between the image-side surface of the first lens element and the object-side surface of the second lens element in a direction parallel to the optical axis is less than 0.2 mm, and the optical imaging lens satisfies:

$6.1 \leq ImaH/(G12+T2)$;

$1.2 \leq G23/EPD$, $T1/T2 \leq 3.7$; and $0.75 \leq T4/G34 \leq 11.8$, where ImaH is an image height of the optical imaging lens, G12 is an air gap from the first lens element to the second lens element on the optical axis, T2 is a thickness of the second lens element on the optical axis, G23 is an air gap from the second lens element to the third lens element on the optical axis, and EPD is a diameter of an entrance pupil of the optical imaging lens, T1 is a thickness of the first lens element on the optical axis, T4 is a thickness of the fourth lens element on the optical axis, and G34 is an air gap from the third lens element to the fourth lens element on the optical axis.

11. The optical imaging lens of claim 10, wherein the optical imaging lens further satisfies: $G34/(G12+T2) \leq 4.3$.

12. The optical imaging lens of claim 10, wherein the optical imaging lens further satisfies: $G23/T2 \leq 20$.

13. The optical imaging lens of claim 10, wherein the optical imaging lens further satisfies: $AAG/T2 \leq 26$, where AAG is a sum of three air gaps from the first lens element to the fourth lens element on the optical axis.

14. The optical imaging lens of claim 10, wherein the optical imaging lens further satisfies: $EFL/T2 \geq 40$, where EFL is an effective focal length of the optical imaging lens.

15. The optical imaging lens of claim 10, wherein the optical imaging lens further satisfies: $1 \leq T1/G34 \leq 32$.

16. The optical imaging lens of claim 10, wherein the optical imaging lens further satisfies: $2 \leq ALT/G34 \leq 31$, where ALT is a sum of thicknesses of the first lens element, the second lens element, the third lens element, and the fourth lens element on the optical axis.

17. The optical imaging lens of claim 10, wherein the optical imaging lens further satisfies: $4 \leq G23/G34 \leq 62$.

18. The optical imaging lens of claim 10, wherein the optical imaging lens further satisfies: $0.44 \leq T3/G34 \leq 6.4$, where T3 is a thickness of the third lens element on the optical axis.

* * * * *